United States Patent
Asanuma et al.

(10) Patent No.: US 9,704,642 B2
(45) Date of Patent: *Jul. 11, 2017

(54) INFORMATION TRANSMISSION APPARATUS AND SYSTEM USING INDUCTIVE COUPLING BETWEEN COILS

(71) Applicant: Panasonic Corporation, Osaka (JP)

(72) Inventors: Kenichi Asanuma, Kyoto (JP); Atsushi Yamamoto, Kyoto (JP); Tsutomu Sakata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 777 days.

This patent is subject to a terminal disclaimer.

(21) Appl. No.: 13/983,664

(22) PCT Filed: Nov. 14, 2012

(86) PCT No.: PCT/JP2012/007305
§ 371 (c)(1),
(2) Date: Aug. 5, 2013

(87) PCT Pub. No.: WO2013/088641
PCT Pub. Date: Jun. 20, 2013

(65) Prior Publication Data
US 2014/0054973 A1 Feb. 27, 2014

(30) Foreign Application Priority Data
Dec. 14, 2011 (JP) .................................. 2011-272906

(51) Int. Cl.
*H01F 38/14* (2006.01)
*H02J 17/00* (2006.01)
(Continued)

(52) U.S. Cl.
CPC .......... *H01F 38/14* (2013.01); *H01F 27/2871* (2013.01); *H02J 17/00* (2013.01);
(Continued)

(58) Field of Classification Search
CPC ........ H01F 38/14; H01F 27/2871; H02J 17/00
(Continued)

(56) References Cited

U.S. PATENT DOCUMENTS 5,214,392 A * 5/1993 Kobayashi .......... H01F 27/2804
330/10
8,072,304 B2 12/2011 Kato et al.
(Continued)

FOREIGN PATENT DOCUMENTS

CN 101304183 11/2008
CN 102005827 4/2011
(Continued)

OTHER PUBLICATIONS

International Preliminary Report on Patentability and Written Opinion of the International Searching Authority issued Jun. 26, 2014 in International (PCT) Application No. PCT/JP2012/007305.
(Continued)

*Primary Examiner* — Jared Fureman
*Assistant Examiner* — James Evans
(74) *Attorney, Agent, or Firm* — Wenderoth, Lind & Ponack, L.L.P.

(57) ABSTRACT

An information transmission system is provided with a transmission coil and a reception coil respectively provided along a first surface and a second surface that face each other proximal to each other. The transmission coil and reception coil are provided proximally to be electromagnetically coupled to each other. The winding wire of the transmission coil is wound on the first surface, and the winding wire of the reception coil is wound on the second surface. The
(Continued)

information transmission system is provided with a magnetic body provided proximately so as to be electromagnetically coupled to the transmission coil and the reception coil to cover at least one part of a region in which at least the winding wires of the transmission coil and reception coil are present between the first surface and the second surface.

8 Claims, 33 Drawing Sheets

(51) Int. Cl.
    *H01F 27/28*     (2006.01)
    *H05B 6/12*     (2006.01)
    *H04B 5/00*     (2006.01)
    *H02J 5/00*     (2016.01)

(52) U.S. Cl.
    CPC ......... *H04B 5/0031* (2013.01); *H04B 5/0037* (2013.01); *H04B 5/0093* (2013.01); *H05B 6/1236* (2013.01); *H02J 5/005* (2013.01); *H05B 2213/06* (2013.01); *Y02B 40/123* (2013.01)

(58) Field of Classification Search
    USPC .......................................................... 307/104
    See application file for complete search history.

(56) References Cited

U.S. PATENT DOCUMENTS

| | | | |
|---|---|---|---|
| 2008/0164844 A1 | 7/2008 | Kato et al. | |
| 2009/0065594 A1 | 3/2009 | Kato et al. | |
| 2010/0181845 A1 | 7/2010 | Fiorello et al. | |
| 2010/0193421 A1 | 8/2010 | Ma et al. | |
| 2010/0219183 A1* | 9/2010 | Azancot | H02J 5/005 219/676 |
| 2011/0049995 A1* | 3/2011 | Hashiguchi | H02J 5/005 307/104 |
| 2011/0266882 A1 | 11/2011 | Yamamoto et al. | |
| 2012/0086283 A1 | 4/2012 | Yamamoto et al. | |
| 2012/0112552 A1* | 5/2012 | Baarman | H05K 9/002 307/104 |
| 2012/0175967 A1* | 7/2012 | Dibben | H02J 5/005 307/104 |

FOREIGN PATENT DOCUMENTS

| | | |
|---|---|---|
| CN | 102239633 | 11/2011 |
| JP | 2-128409 | 5/1990 |
| JP | 2001-309579 | 11/2001 |
| JP | 2008-172873 | 7/2008 |
| JP | 2010-183757 | 8/2010 |
| JP | 2011-50140 | 3/2011 |
| WO | 2010/036980 | 4/2010 |
| WO | 2011/138860 | 11/2011 |

OTHER PUBLICATIONS

International Preliminary Report on Patentability and Written Opinion of the International Searching Authority issued Jun. 26, 2014 in International (PCT) Application No. PCT/JP2012/007304.
Office Action issued Jan. 12, 2016 in Chinese Application No. 201280008041.4, with English translation.
Office Action issued Feb. 2, 2016 in Chinese Application No. 201280007948.9, with English translation.
International Search Report issued Jan. 22, 2013 in International (PCT) Application No. PCT/JP2012/007305.
International Search Report issued Jan. 22, 2013 in International (PCT) Application No. PCT/JP2012/007304.
Hiroyuki Okabe et al., "Realization of Magnetic Resonant Coupling in kHz Frequency Band and The Effect of Ferrite", Proceeding of the 2010 IEICE General Conference, The Institute of Electronics, Information and Communication Engineers in Japan, Communication 1, B-1-28, in Sendai Japan, Mar. 2, 2010 along with partial English translation.
Supplementary European Search Report issued May 11, 2015 in European Patent Application No. 12858005.7.
Office Action issued Jul. 1, 2016 in U.S. Appl. No. 13/983,617.

* cited by examiner

INFORMATION TRANSMISSION APPARATUS AND SYSTEM USING INDUCTIVE COUPLING BETWEEN COILS

TECHNICAL FIELD

The present disclosure relates to a noncontact connector apparatus and a noncontact connector system, each using inductive coupling between coils, and an information transmission apparatus and an information transmission system including the same apparatus and system.

BACKGROUND ART

In recent years, to perform wireless charging in an electronic device and an EV device with mobility such as portable telephones and electric vehicles, developments of a noncontact connector apparatus and a noncontact connector system using inductive coupling between coils, and a power transfer apparatus and a power transfer system including the same apparatus and system have been promoted. As a noncontact power transfer system, for example, the inventions of the Patent Documents 1 to 3 have been known.

The noncontact power feeding apparatus of the Patent Document 1 is characterized by including a furniture with a power primary coil supplied with electric power, a cordless device including a power secondary coil arranged in magnetic fluxes caused by the power primary coil in such a state that the same apparatus is arranged in a predetermined arrangement position with respect to the furniture, and informing means for informing of the predetermined arrangement position of the cordless device with respect to the furniture.

The contactless power transfer coil of the Patent Document 2 is characterized by including a planar coil formed by winding a linear conductor in a spiral form within a roughly identical plane, and a magnetic layer that is formed by coating a liquid magnetic material solution in which magnetic particles are mixed in a binder solvent and coated so as to cover one planar portion of the planar coil and a side surface portion of the planar coil.

The wireless transmission system of the Patent Document 3 includes a resonator for wireless power transfer, and this has a conductor that forms one or more loops and has a predetermined inductance, and a capacitor network that has predetermined capacitances and desired electrical parameters and is connected to the conductor. In this case, the capacitor network includes at least one capacitor of a first type having a first temperature profile as an electrical parameter, and at least one capacitor of a second type having a second temperature profile as an electrical parameter.

The principle of such a noncontact power transfer system is applicable also to an information transmission system including a noncontact connector apparatus and an induction heating apparatus such as an IH cooking apparatus and the like.

PRIOR ART DOCUMENTS

Patent Documents

Patent Document 1: Japanese patent laid-open publication No. JP 2001-309579 A;
Patent Document 2: Japanese patent laid-open publication No. JP 2008-172873 A; and
Patent Document 3: U.S. patent application publication No. US 2010/0181845 A1.

In order to achieve a high transmission efficiency in a noncontact power transfer system, it is beneficial to make a transmitter coil provided for the power transfer apparatus (e.g., charger) on the transmitter side and a receiver coil provided for the power transfer apparatus (e.g., object to be charged) on the receiver side opposed to each other accurately aligned in position so that the transmitter coil and the receiver coil are electromagnetically strongly coupled to each other.

According to the inventions of the Patent Documents 1 and 2, there is such a problem that the transmission efficiency decreases when a positional misalignment occurs despite that a high transmission efficiency can be achieved when the opposed transmitter coil and receiver coil opposed to each other are accurately aligned in position.

In order to solve the decrease in the transmission efficiency due to positional misalignment, an impedance matching circuit is dynamically changed in the invention of the Patent Document 3. However, such a solution method had such a problem that the controlling becomes complicated.

Similar problems exist in not only noncontact power transfer systems but also information transmission systems with noncontact connectors and induction heating apparatuses.

An object of the present disclosure is to provide an information transmission apparatus and an information transmission system that are tolerant of positional misalignment of the transmitter coil and the receiver coil and has a high transmission efficiency with a simple configuration.

SUMMARY

According to a first aspect of the present disclosure, there is provided an information transmission apparatus including a transmitter circuit configured to transmit information to a receiver circuit connected to a receiver coil; and a first noncontact connector apparatus connected to the transmitter circuit. The first noncontact connector apparatus comprises a transmitter coil, that is provided to be adjacent so as to be electromagnetically coupled to the receiver coil, and a winding of the transmitter coil is wound on a first plane. The information transmission apparatus includes a first magnetic body provided between the first plane and a second plane which is opposed to be adjacent to the first plane and on which the receiver coil is provided, and the first magnetic body is provided to be adjacent so as to be electromagnetically coupled to the transmitter coil and to cover at least one part of a region in which at least the winding of the transmitter coil exists.

According to a second aspect of the present disclosure, there is provided an information transmission apparatus including: a receiver circuit configured to receive information from a transmitter circuit connected to a transmitter coil; and a second noncontact connector apparatus connected to the receiver circuit. The second noncontact connector apparatus includes a receiver coil, that is provided to be adjacent so as to be electromagnetically coupled to the transmitter coil, and a winding of the receiver coil is wound on a second plane that is opposed to be adjacent to the first plane on which the transmitter coil is provided. The information transmission apparatus includes a second magnetic body provided between the first plane and the second plane, and the second magnetic body is provided to be adjacent so as to be electromagnetically coupled to the receiver coil and to cover at least one part of a region in which at least the winding of the receiver coil exists.

According to a third aspect of the present disclosure, there is provided an information transmission system including: the information transmission apparatus according to the first or second aspect of the present disclosure serving as a first information transmission apparatus including the transmitter circuit; and a second information transmission apparatus including the receiver circuit, and a second noncontact connector apparatus connected to the receiver circuit. The second noncontact connector apparatus comprises a receiver coil including a winding wound on the second plane. The first magnetic body is further put to be adjacent to the receiver coil to be electromagnetically coupled to the receiver coil and to cover at least one part of a region in which at least the winding of the receiver coil exists between the first plane and the second plane, thereby increasing the self-inductance of the receiver coil by putting the first magnetic body to be adjacent to the receiver coil. A coupling coefficient between the transmitter coil and the receiver coil is set to be decreased by increasing the self-inductance of each of the transmitter coil and the receiver coil so that a frequency characteristic of transmission efficiency from the transmitter coil to the receiver coil changes from a double-peaked narrow-band characteristic to a single-peaked wide-band characteristic.

According to a fourth aspect of the present disclosure, there is provided an information transmission system including: the information transmission apparatus according the first or second aspect of the present disclosure serving as a first information transmission apparatus including the transmitter circuit; and the information transmission apparatus according to the third or fourth aspect of the present disclosure serving as a second information transmission apparatus including the receiver circuit. A coupling coefficient between the transmitter coil and the receiver coil is set to be decreased by increasing the self-inductance of each of the transmitter coil and the receiver coil so that a frequency characteristic of transmission efficiency from the transmitter coil to the receiver coil changes from a double-peaked narrow-band characteristic to a single-peaked wide-band characteristic.

According to the information transmission apparatus and the information transmission system of the present disclosure, information can be transmitted with a stabilized transmission efficiency with a very simple configuration even if positional misalignment occurs between the transmitter coil and the receiver coil.

DETAILED DESCRIPTION

Figure 1:
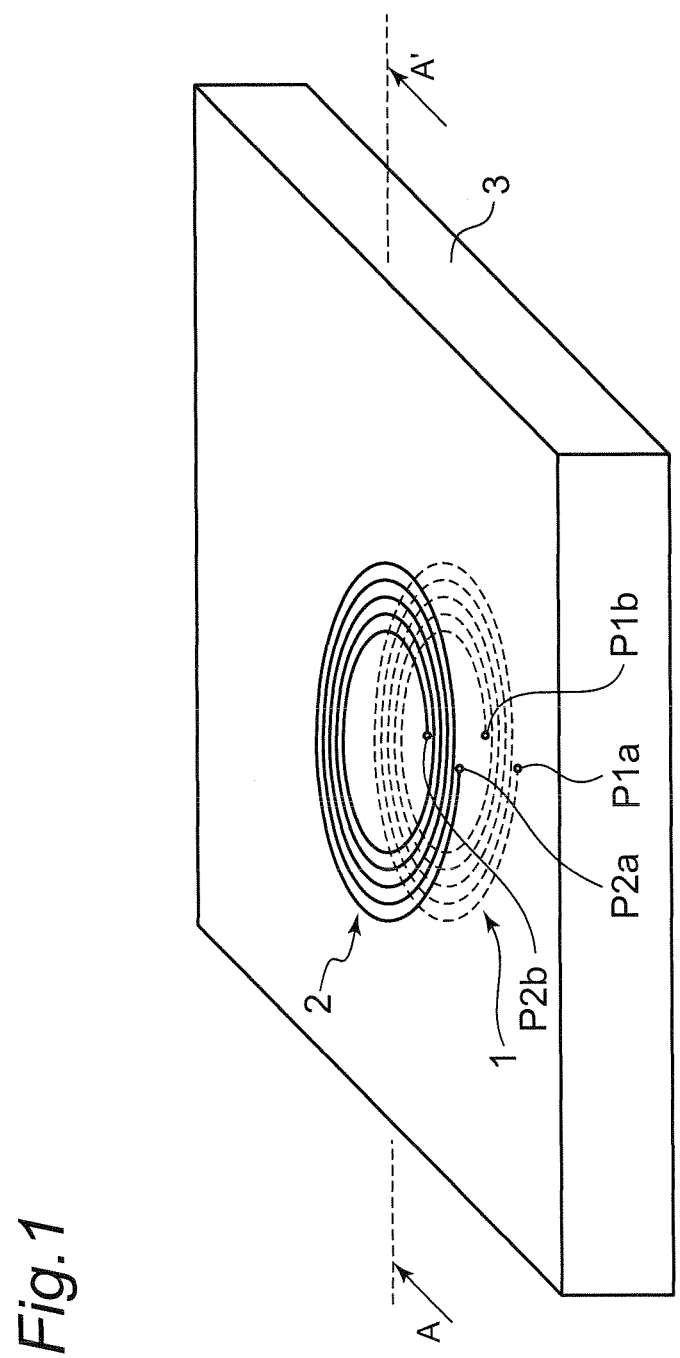
FIG. 1 is a perspective view showing a schematic configuration of a power transfer system according to a first embodiment of the present disclosure.

Embodiments of the present disclosure will be described below with reference to the drawings. It is noted that like components are denoted by like reference numerals.

First Embodiment

Figure 2:
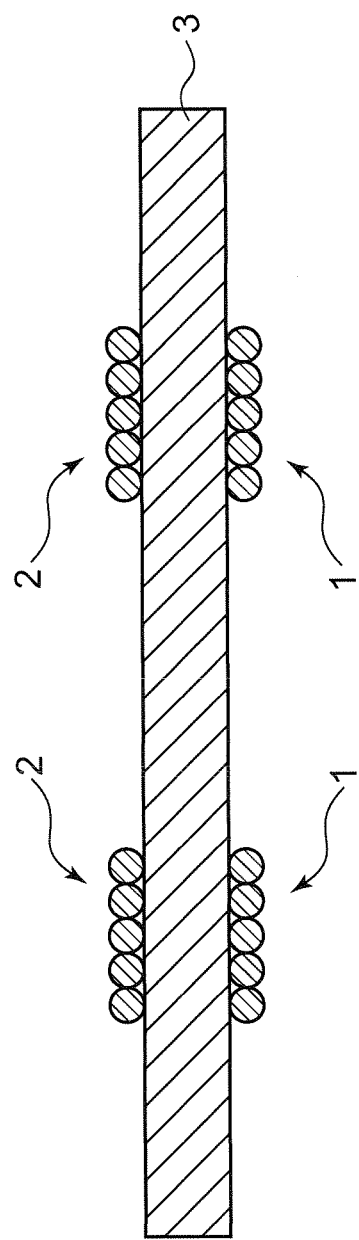
FIG. 2 is a sectional view along a line A-A' of FIG. 1.

FIG. 1 is a perspective view showing a schematic configuration of a power transfer system according to the first embodiment of the present disclosure. FIG. 2 is a sectional view along a line A-A' of FIG. 1. The power transfer system of the present embodiment is configured to include a noncontact connector system that uses electromagnetical coupling between a transmitter coil 1 and a receiver coil 2. In FIG. 1 and other figures, a power supply, a power transmitter circuit, a power receiver circuit and so on which is beneficial for use in a power transfer system are omitted for simplicity of illustration, and only the noncontact connector system is shown. It is noted that the noncontact connector system is assumed to be configured to include a noncontact connector apparatus that includes a transmitter coil 1 on the transmitter side, and a noncontact connector apparatus that includes a receiver coil 2 on the receiver side.

In the power transfer system of FIG. 1, the noncontact connector system is configured to include the transmitter coil 1 and the receiver coil 2, which are provided along a first plane and a second plane, respectively, and arranged to be adjacent and oppose to each other. The transmitter coil 1 has terminals P1a and P1b, and the receiver coil 2 has terminals P2a and P2b. The transmitter coil 1 and the receiver coil 2 are arranged to be adjacent to each other so as to be electromagnetically coupled to each other. The transmitter coil 1 is provided along the first plane so that its winding is wound around the peripheries of a predetermined region on the first plane. Likewise, the receiver coil 2 is provided along the second plane so that its winding is wound around the peripheries of a predetermined region on the second plane. The noncontact connector system is configured to include a magnetic material 3 having a predetermined relative permeability. The magnetic material 3 is provided between the first and second planes, so as to be electromagnetically coupled to the transmitter coil 1 and the receiver coil 2 and to cover at least one part of a region, in which the windings of the transmitter coil 1 and the receiver coil 2 exist between the first plane and the second plane. The magnetic material 3 is made of, for example, ferrite. A self-inductance of the transmitter coil 1 is increased by putting the magnetic material 3 to be adjacent to the magnetic material 3, and a self-inductance of the receiver coil 2 is increased by putting the magnetic material 3 to be adjacent to the receiver coil 2.

The power transfer system of the present embodiment is characterized in that a coupling coefficient between the transmitter coil 1 and the receiver coil 2 is set to be decreased by increasing the self-inductances of the transmitter coil 1 and the receiver coil 2, so that a frequency characteristic of transmission efficiency from the transmitter coil 1 to the receiver coil 2 changes from a double-peaked narrow-band characteristic to a single-peaked wide-band characteristic.

The principle of operation of the noncontact connector system of the present embodiment will be described below.

Figure 3:
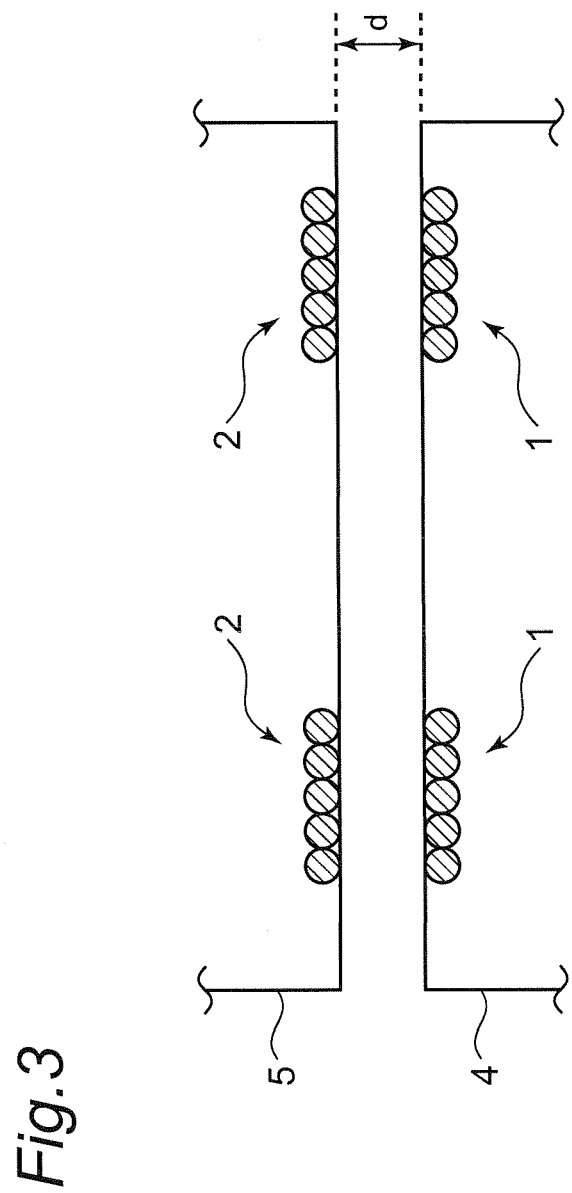
FIG. 3 is a sectional view showing a schematic configuration of a power transfer system of a comparative example.

FIG. 3 is a sectional view showing a schematic configuration of the power transfer system of a comparative example. In the power transfer system of FIG. 3, the noncontact connector system is similar to the noncontact connector system of FIG. 1 except for not having the magnetic material 3. The transmitter coil 1 is provided in a casing 4 of the noncontact connector apparatus on the transmitter side, and the receiver coil 2 is provided in a casing 5 of the noncontact connector apparatus on the receiver side. The transmitter coil 1 and the receiver coil 2 are separated to be apart by a distance d provided therebetween.

In the power transfer system of FIG. 3, when a current flows in the transmitter coil 1, an induced electromotive force is generated at the receiver coil 2 due to electromagnetic fields in the peripheries of the transmitter coil 1 formed by the current, and an induced current flows in the receiver coil 2. In other words, the transmitter coil 1 and the receiver coil 2 are electromagnetically coupled to each other. The coupling coefficient k of the following equation is used as an index to evaluate the degree of the coupling:

$$k = \frac{M}{\sqrt{L1} \times \sqrt{L2}} \text{ for } 0 \leq |k| \leq 1,$$

where M represents an mutual inductance between the transmitter coil 1 and the receiver coil 2, L1 represents the self-inductance of the transmitter coil 1, and L2 represents the self-inductance of the receiver coil 2.

Figure 4:
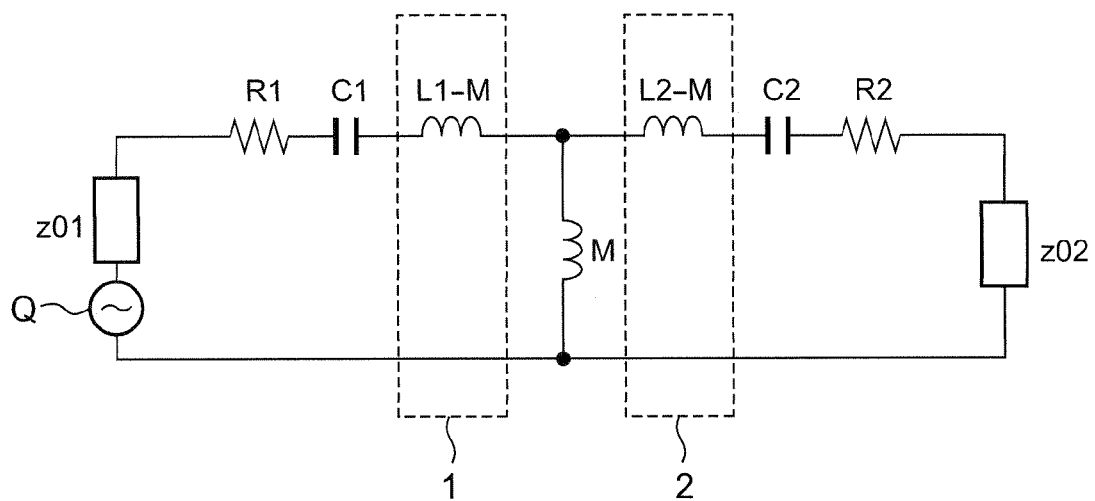
FIG. 4 is a circuit diagram showing one example of an equivalent circuit of the power transfer system of FIG. 3.

FIG. 4 is a circuit diagram showing one example of an equivalent circuit of the power transfer system of FIG. 3. Q is a signal source, z01 is the load impedance of the transmitter circuit, and z02 is the load impedance of the receiver circuit and the load. R1 and R2 are resistors, and C1 and C2 are capacitors for impedance matching. When the power transfer system operates at an angular frequency ω, a parameter S21 representing a transmission efficiency can be expressed by the following equation using the self-inductances L1 and L2, and the mutual inductance M:

[Equation 1]
$$S21 = \frac{j \cdot 2 \cdot \omega \cdot M \cdot \sqrt{Re[z01] \cdot Re[z02]}}{\left(\frac{(R1+z01)+j \cdot}{\left(\omega \cdot L1 - \frac{1}{\omega \cdot C1}\right)}\right) \cdot \left(\frac{(R2+z02)+j \cdot}{\left(\omega \cdot L2 - \frac{1}{\omega \cdot C2}\right)}\right) + (\omega \cdot M)^2}$$

It is noted that the equivalent circuit of FIG. 4 and the expression of the parameter S21 are mere examples, and the equivalent circuit and the transmission efficiency of the power transfer system may be expressed by other arbitrary appropriate models.

When the transmitter coil 1 and the receiver coil 2 are electromagnetically strongly coupled to each other, |k|≈1. However, the value of |k| decreases as the distance d increases, and |k|=0 when the transmitter coil 1 and the receiver coil 2 are not electromagnetically coupled to each other.

Figure 5:
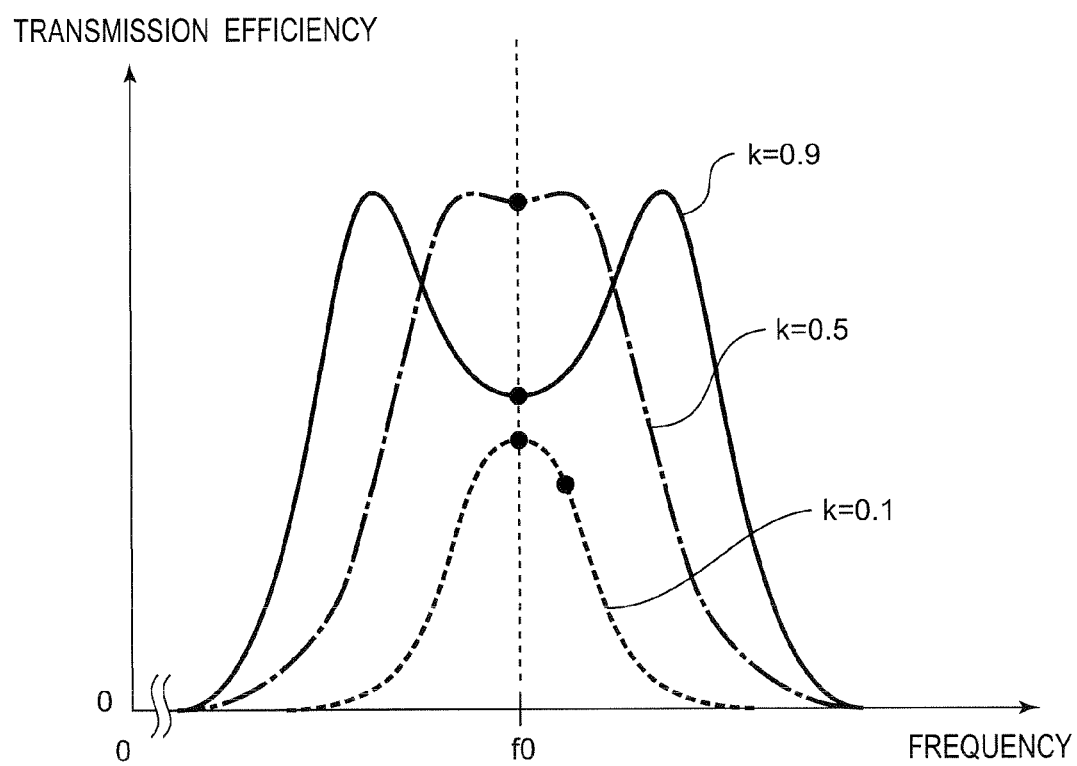
FIG. 5 is a schematic diagram showing frequency characteristics of transmission efficiency when a coupling coefficient k between a transmitter coil 1 and a receiver coil 2 of FIG. 3 is changed.

FIG. 5 is a schematic graph showing frequency characteristics of transmission efficiency when the coupling coefficient k between the transmitter coil 1 and the receiver coil 2 of FIG. 3 is changed. In FIG. 5, it is assumed that the Q value is constant. According to FIG. 5, it can be understood that the bandwidth of transmission efficiency changes in accordance with the magnitude of the coupling coefficient k. Normally, when the electromagnetic coupling of the transmitter coil 1 and the receiver coil 2 is strong, a double-peaked narrow-band characteristic results, and wide band operation cannot be achieved. That is, in order to achieve wide band operation, it is beneficial to lower the coupling coefficient k under the condition that the transmitter coil 1 and the receiver coil 2 are adjacent to each other. Since the coupling coefficient k is a ratio of the square root of the self-inductances L1 and L2 to the mutual inductance M, the coupling coefficient k can be decreased if the self-inductances L1 and L2 can be increased.

Figure 6:
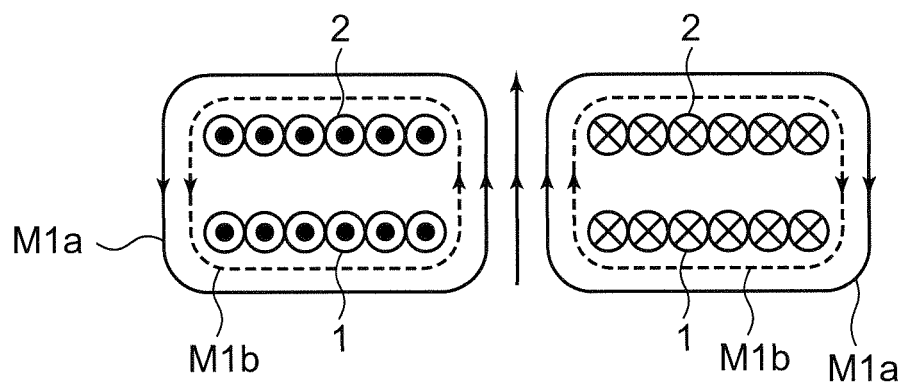
FIG. 6 is a schematic diagram showing flows of magnetic fluxes in the power transfer system of FIG. 3.
Figure 7:
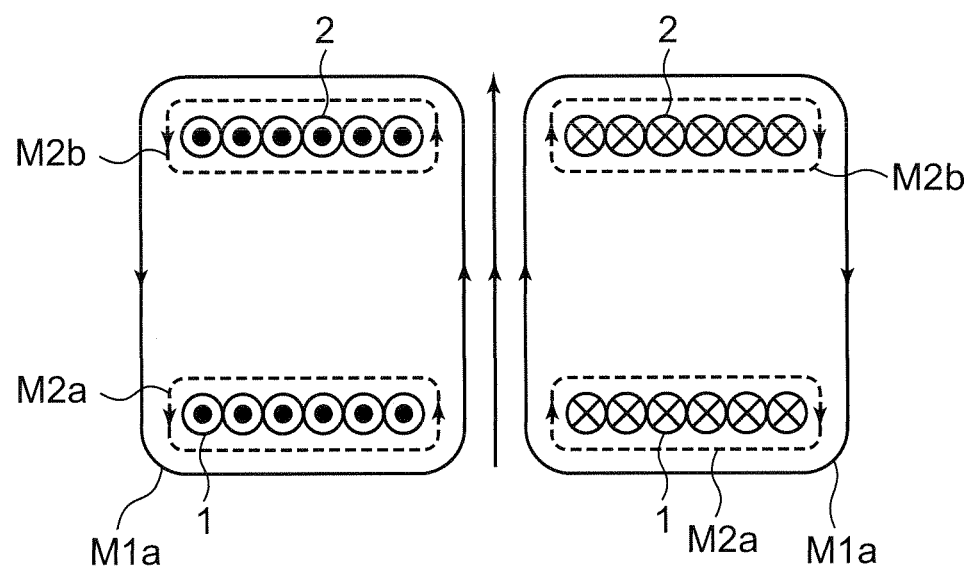
FIG. 7 is a schematic diagram showing flows of magnetic fluxes when a distance d between the transmitter coil 1 and the receiver coil 2 is increased in the power transfer system of FIG. 3.
Figure 8:
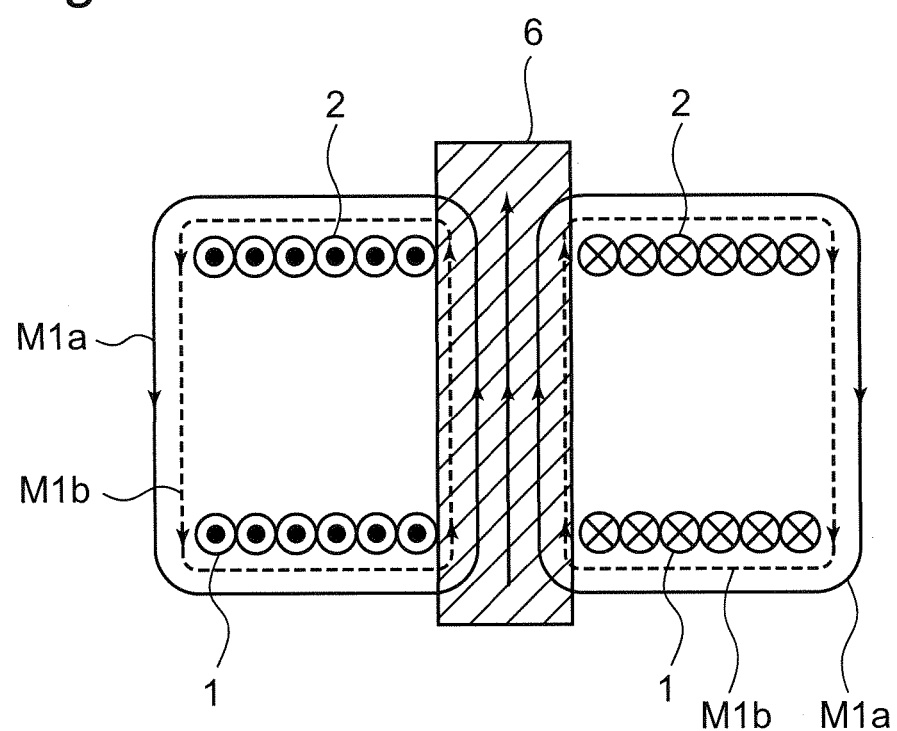
FIG. 8 is a schematic diagram showing flows of magnetic fluxes when the distance "d" between the transmitter coil 1 and the receiver coil 2 is increased and a magnetic material 6 is inserted in the power transfer system of FIG. 3.

FIGS. 6 to 8 are schematic diagrams showing flows of magnetic fluxes in the power transfer system of FIG. 3, respectively. In FIGS. 6 to 8, the casings 4 and 5 of FIG. 3 are omitted, and the transmitter coil 1 and the receiver coil 2 are only shown. In a case where the transmitter coil 1 and the receiver coil 2 are adjacent to each other as shown in FIG. 6, when a current flows in the transmitter coil 1, magnetic fluxes M1a and M1b are formed so as to surround both of the transmitter coil 1 and the receiver coil 2, and the mutual inductance M increases, making the coupling coefficient k higher. FIG. 7 is a schematic diagram showing flows of magnetic fluxes when the distance d between the transmitter coil 1 and the receiver coil 2 is increased in the power transfer system of FIG. 3. In a case where the transmitter coil 1 and the receiver coil 2 are apart from each other as shown in FIG. 7, when a current flows in the transmitter coil 1, magnetic fluxes M2a and M2b partially become leakage fluxes among the magnetic fluxes formed in the peripheries of the transmitter coil 1 and receiver coil 2, and therefore, the mutual inductance M decreases, making the coupling coefficient k lower. FIG. 8 is a schematic diagram showing flows of the magnetic fluxes when the distance d between the transmitter coil 1 and the receiver coil 2 is increased, and a magnetic material 6 is inserted in the power transfer system of FIG. 3. In a case where the transmitter coil 1 and the receiver coil 2 are apart from each other, by inserting the magnetic material 6 (iron, ferrite, or the like) in the center portion of the transmitter coil 1 and the receiver coil 2 as shown in FIG. 8, the leakage fluxes M2a and M2b of FIG. 7 can be changed into a magnetic flux M1b surrounding both of the transmitter coil 1 and the receiver coil 2 through the inside of the magnetic material 6, consequently increasing the mutual inductance M and making the coupling coefficient k higher.

Under the condition that the transmitter coil 1 and the receiver coil 2 are adjacent to each other as shown in FIG. 6, the coupling coefficient k becomes higher as described before, and therefore, any wide band operation cannot be achieved. Therefore, it is beneficial to increase the self-inductances L1 and L2 by controlling the flows of the magnetic fluxes instead of decreasing the mutual inductance M.

Figure 9:
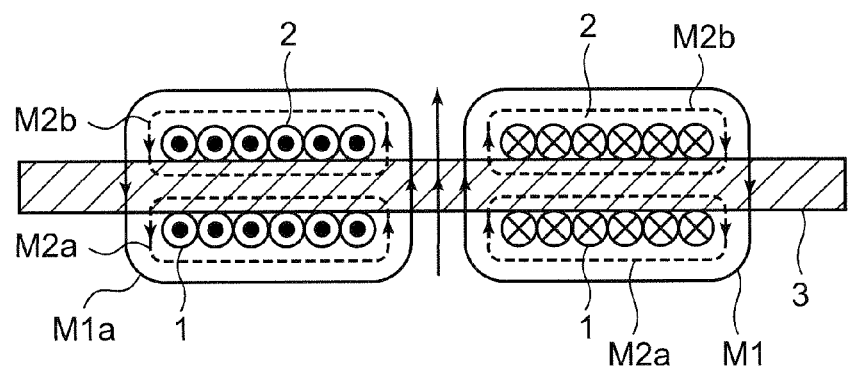
FIG. 9 is a schematic diagram showing flows of magnetic fluxes in the power transfer system of FIG. 1.

FIG. 9 is a schematic diagram showing flows of magnetic fluxes in the power transfer system of FIG. 1. When a current flows in the transmitter coil 1, a partial magnetic flux M1 is formed so as to surround both of the transmitter coil 1 and the receiver coil 2 through the magnetic material 3. However, the other partial magnetic flux M2a is not directed toward the receiver coil 2 passing only in the vicinity of the transmitter coil 1 in the magnetic material 3 and but formed as a leakage flux surrounding only the transmitter coil 1. By forming the leakage flux M2a, the self-inductance L1 of the transmitter coil 1 increases. Likewise, when an induced current flows in the receiver coil 2, the magnetic flux is not directed toward the transmitter coil 1 passing only in the vicinity of the receiver coil 2 in the magnetic material 3, but forms the leakage flux M2b surrounding only the receiver coil 2. By forming the leakage flux M2b, the self-inductance L2 of the receiver coil 2 increases. As described above, in the power transfer system of FIG. 1, the self-inductances L1 and L2 increase due to the magnetic material 3 provided, and the coupling coefficient k is decreased by comparison with the case of FIG. 6, therefore allowing the wide band operation to be achieved.

Figure 10:
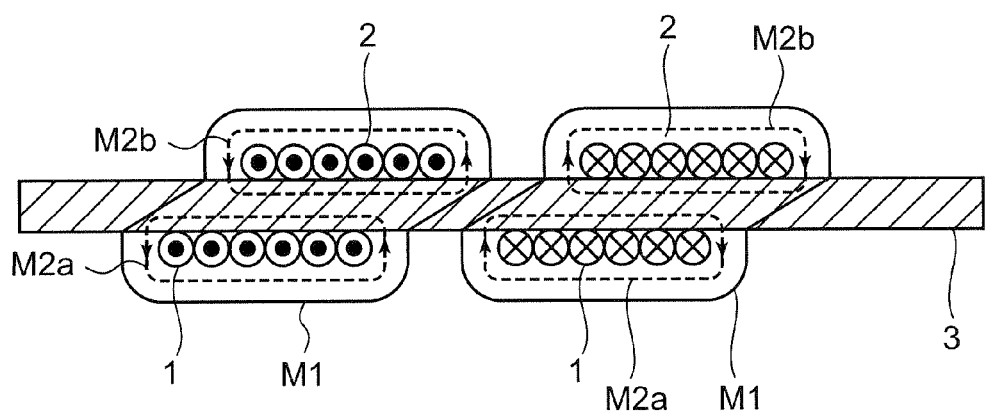
FIG. 10 is a schematic diagram showing flows of magnetic fluxes when the transmitter coil 1 and the receiver coil 2 are misaligned in position in the power transfer system of FIG. 1.

FIG. 10 is a schematic diagram showing flows of magnetic fluxes when the transmitter coil 1 and the receiver coil 2 are misaligned in position in the power transfer system of FIG. 1. In this case also, the leakage flux M2a surrounding only the transmitter coil 1 and the leakage flux M2b surrounding only the receiver coil 2 are formed in a manner similar to that of the case of FIG. 9. Therefore, the self-inductances L1 and L2 increase due to the magnetic material 3 provided in a manner similar to that of the case of FIG. 9, and the coupling coefficient k is decreased by comparison with the case of FIG. 6, and therefore this allows the wide band operation to be achieved.

The beneficial coupling coefficient k is described with reference to FIG. 5. As described above, when the electromagnetic coupling of the transmitter coil 1 and the receiver coil 2 is strong, the double-peaked narrow-band characteristic results. However, when the coupling coefficient k gradually decreases, a frequency interval between the two peaks of transmission efficiency gradually decreases, and the minimum value of transmission efficiency between the two peaks gradually increases. When the frequency interval becomes substantially zero, i.e., when a difference between the two peaks of transmission efficiency and the minimum value between them decreases (e.g., 5 to 10%), the bandwidth of the power transfer system is maximized. The coupling coefficient k is determined so as to satisfy this beneficial point, and the parameters (the thickness and the relative permeability of the magnetic material 3, the number of turns of the transmitter coil 1 and the receiver coil 2, etc.) of the power transfer system are determined so as to achieve this value of the coupling coefficient k.

Figure 27:
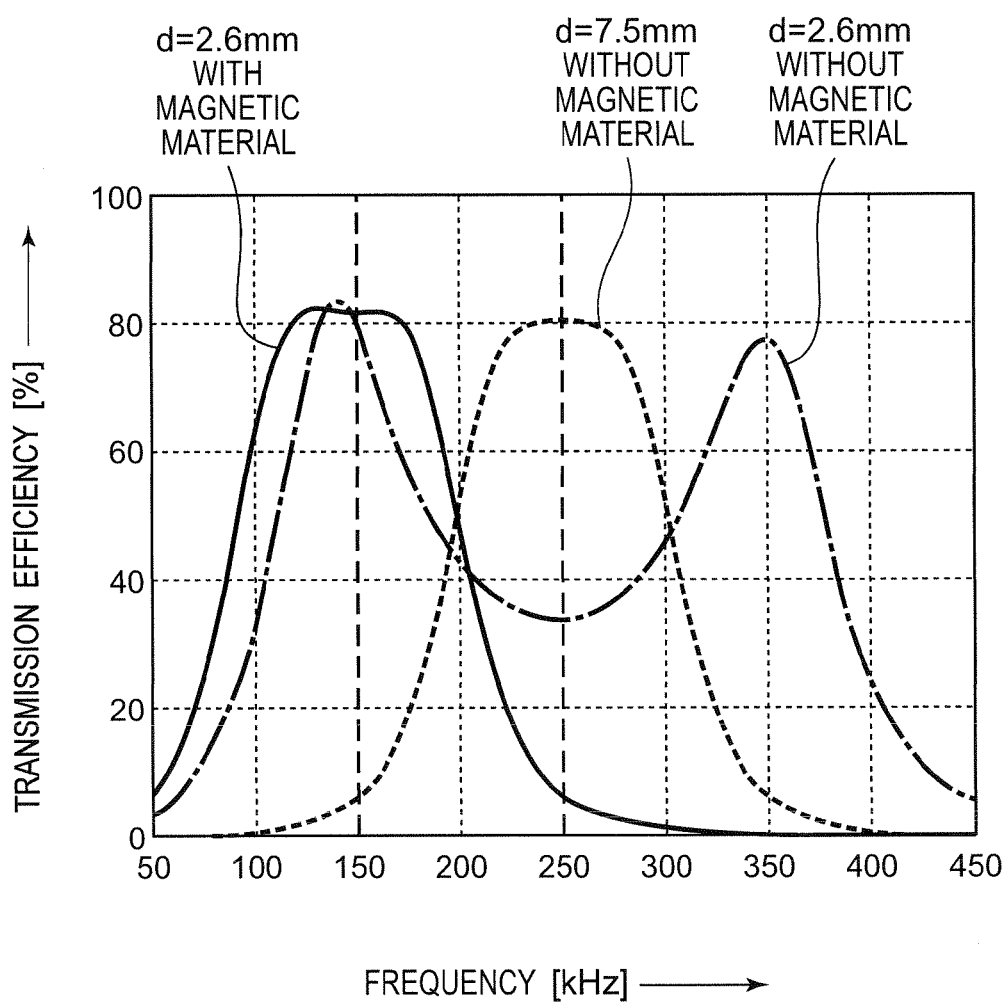
FIG. 27 is a graph showing frequency characteristics of transmission efficiency of the power transfer system of FIG. 25.

When the magnetic material 3 is provided between the transmitter coil 1 and the receiver coil 2 that are separated to be apart by the distance d provided therebetween, a single-peaked wide-band characteristic results in the presence of the magnetic material ("d=2.6 mm with the magnetic material", a plot of solid line) in contrast to the double-peaked narrow-band characteristic in the absence of the magnetic material ("d=2.6 mm with no magnetic material", a plot of alternate long and short line) as described later with reference to FIG. 27. Although the double-peaked characteristic is exhibited in the case of the power transfer system in the absence of the magnetic material since the coupling coefficient k is high, the coupling coefficient k decreases due to the effects of the magnetic material 3, and wide band operation can be achieved in the case of the power transfer system of the present embodiment. Moreover, according to FIG. 27, when the case in the absence of the magnetic material ("d=2.6 mm with no magnetic material", a plot of alternate long and short dash line) and the case in the presence of the magnetic material ("d=2.6 mm with the magnetic material", a plot of solid line) are compared with each other, the resonance frequency decreases from 250 kHz to 150 kHz due to increases in the self-inductances L1 and L2 when the magnetic material 3 is provided. In other words, a size reduction effect can also be obtained due to the decrease in the resonance frequency in the power transfer system of the present embodiment.

Next, the tolerance of the power transfer system of the present embodiment with regard to the positional misalignment of the transmitter coil 1 and the receiver coil 2 is described with reference to FIGS. 11 to 18.

Figure 11:
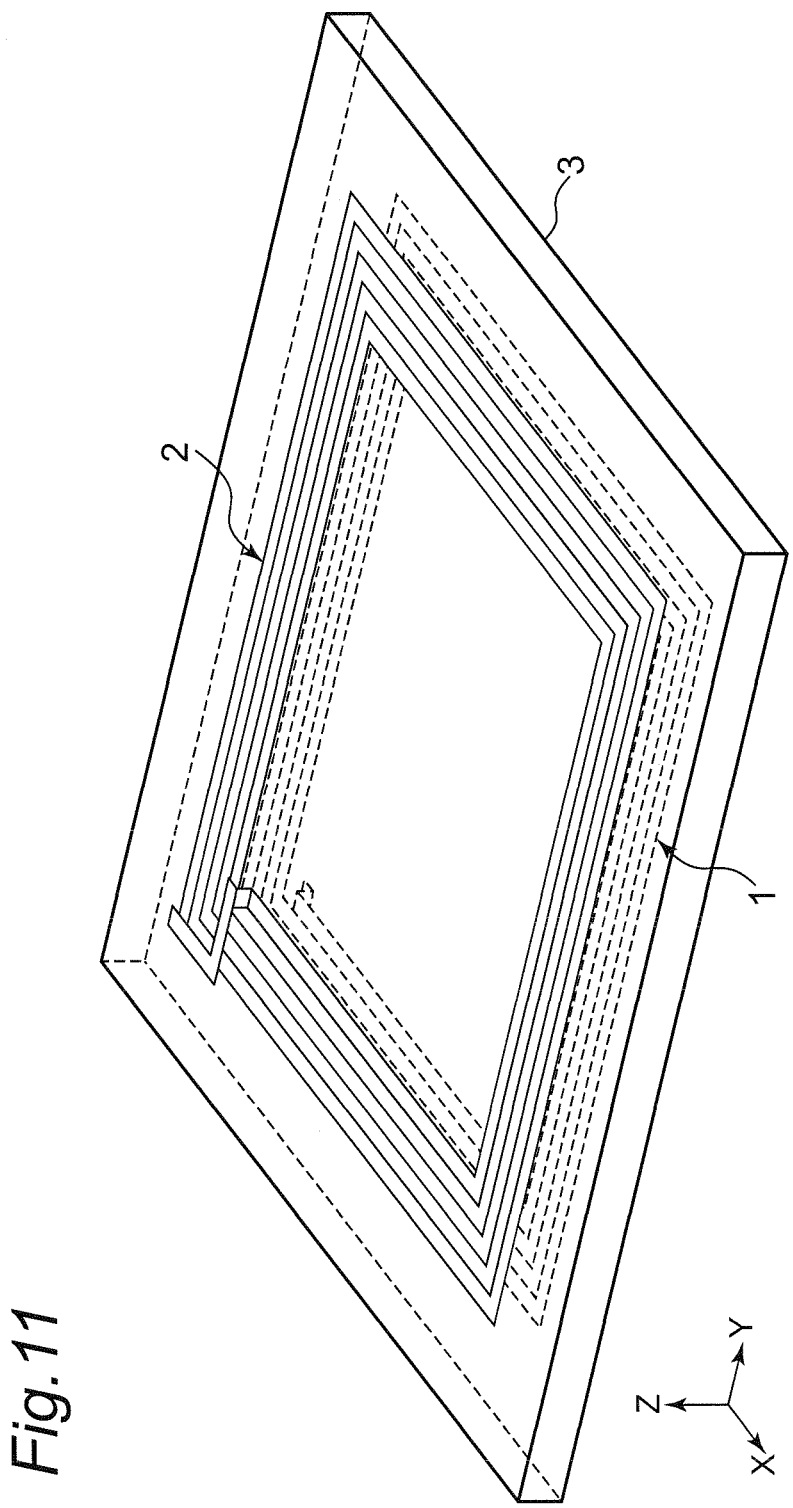
FIG. 11 is a perspective view showing a schematic configuration of a power transfer system according to a first implemental example of the present disclosure.
Figure 12:
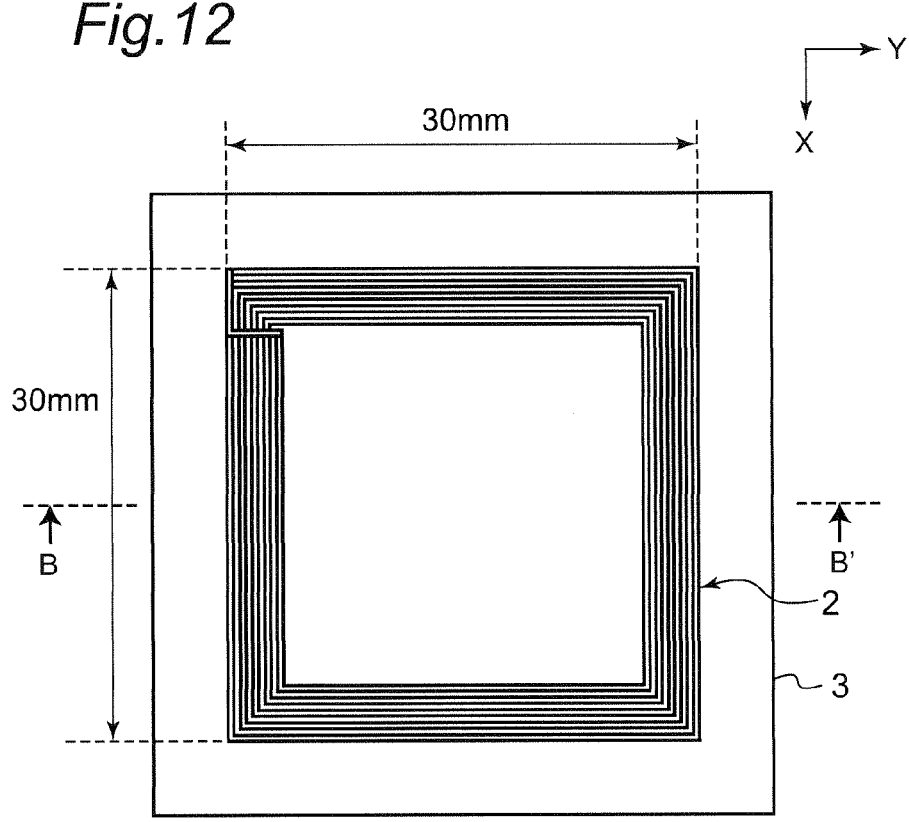
FIG. 12 is a top view of the power transfer system of FIG. 11.
Figure 13:
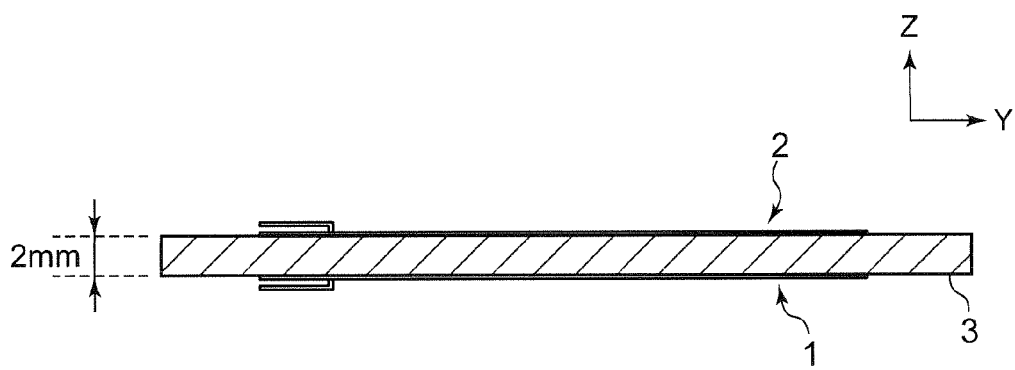
FIG. 13 is a sectional view along a line B-B' of FIG. 11.
Figure 14:
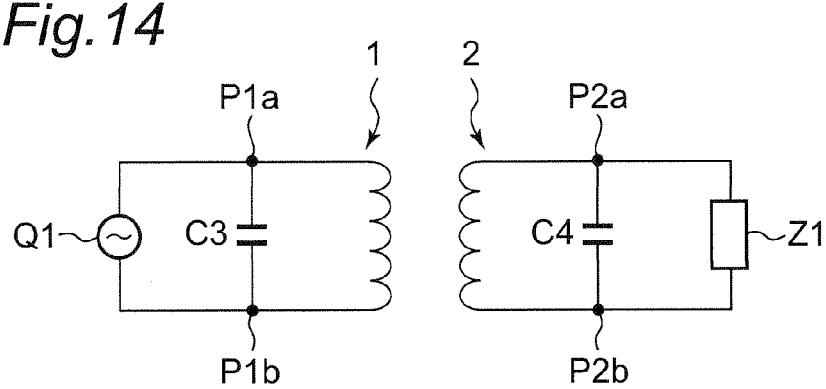
FIG. 14 is a circuit diagram showing an equivalent circuit of the power transfer system of FIG. 11.
Figure 15A:
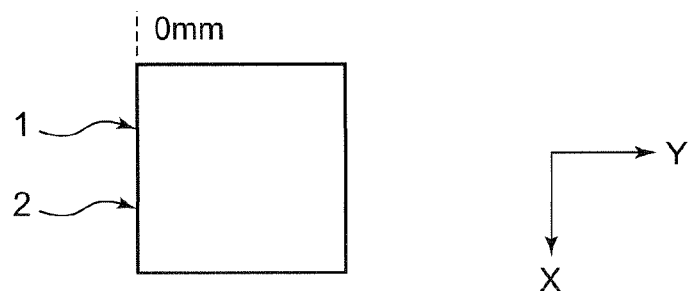
FIG. 15 is a diagram showing a positional misalignment generated between the transmitter coil 1 and the receiver coil 2 in the power transfer system of FIG. 11.
Figure 15B:
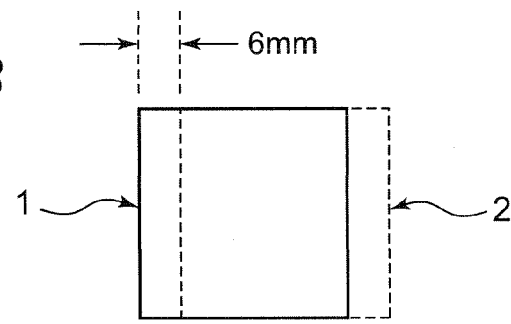
Figure 15C:
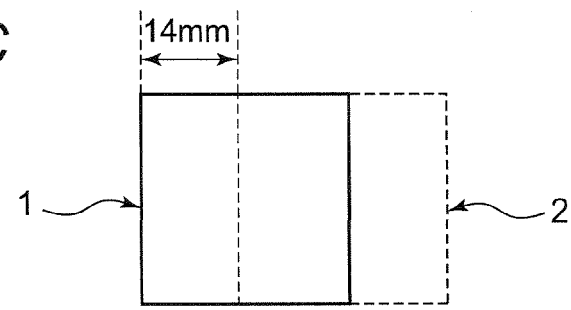

FIG. 11 is a perspective view showing a schematic configuration of the power transfer system according to the first implemental example of the present disclosure. FIG. 12 is a top view of the power transfer system of FIG. 11. FIG. 13 is a sectional view along a line B-B' of FIG. 11. The transmitter coil 1 and the receiver coil 2 are rectangular coils that have square outer peripheries of 30 mm×30 mm, a wiring width of 0.4 mm, a wiring pitch of 0.4 mm, and a wiring thickness of 0.2 mm, and a number of turns is five. The transmitter coil 1 and the receiver coil 2 are opposed to each other at a distance d=2 mm provided therebetween. A ferrite magnetic material 3 having a thickness of 2 mm and a relative permeability of 10 is provided between the transmitter coil 1 and the receiver coil 2. FIG. 14 is a circuit diagram showing an equivalent circuit of the power transfer system of FIG. 11. Q1 is a signal source, Z1 is a load impedance, and C3 and C4 are capacitors loaded for impedance matching. The capacitors C3 and C4 have a capacitance of 20 nF. FIG. 15 is a diagram for explaining positional misalignments generated between the transmitter coil 1 and the receiver coil 2 in the power transfer system of FIG. 11. The receiver coil 2 was displaced in the Y direction with respect to the transmitter coil 1 as shown in FIG. 15. It is assumed that the magnetic material 3 has a sufficient length in the Y direction so that the displacement in FIG. 15 can be achieved.

According to computer simulations (FIGS. 16 to 21, FIG. 23 and FIG. 24), an impedance matrix between the transmitter coil 1 and the receiver coil 2 was calculated by using the finite element method, and $100 \times |S21|^2$ was obtained as a transmission efficiency between the transmitter coil 1 and the receiver coil 2.

Figure 16:
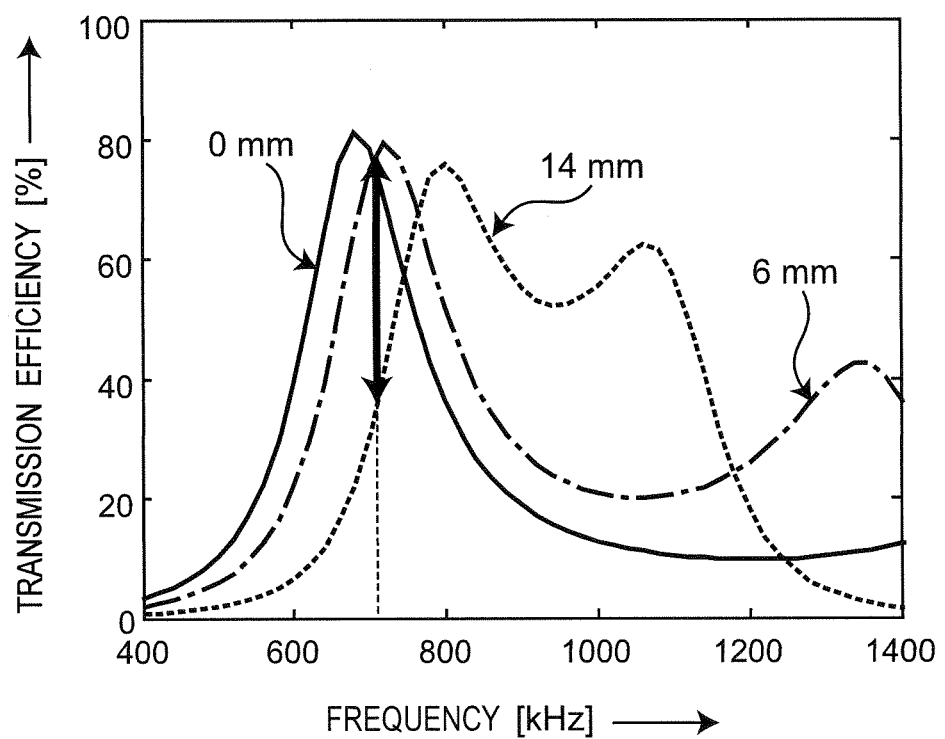
FIG. 16 is a graph showing frequency characteristics of transmission efficiency when the positional misalignment of the transmitter coil 1 and the receiver coil 2 is changed in the power transfer system of FIG. 11 from which the magnetic material 3 is removed.
Figure 17:
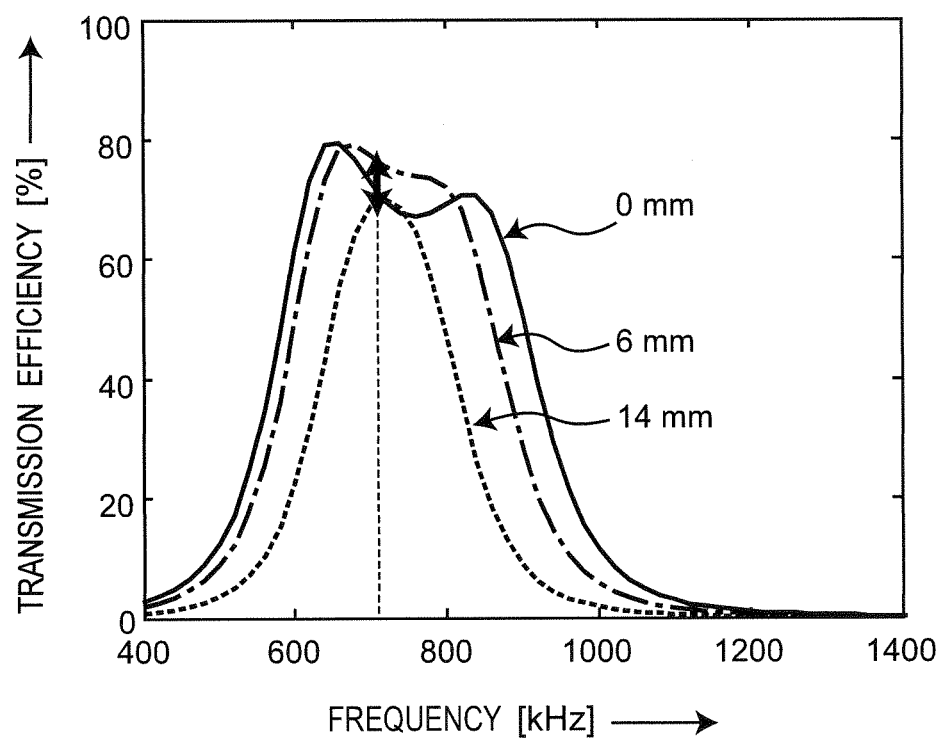
FIG. 17 is a graph showing frequency characteristics of transmission efficiency when the positional misalignment of the transmitter coil 1 and the receiver coil 2 is changed in the power transfer system of FIG. 11.

FIG. 16 is a graph showing a frequency characteristic of transmission efficiency when the positional misalignment of the transmitter coil 1 and the receiver coil 2 is changed in the power transfer system of FIG. 11 from which the magnetic material 3 is removed. FIG. 17 is a graph showing a frequency characteristic of transmission efficiency when the positional misalignment of the transmitter coil 1 and the receiver coil 2 is changed in the power transfer system of FIG. 11. It can be understood that the resonance frequency shifts to a higher frequency as the displacement between the transmitter coil 1 and the receiver coil 2 increases, and the transmission efficiency decreases in the absence of the magnetic material 3 (FIG. 16). Assuming that the operating frequency is about 700 kHz, then large fluctuations occur in the transmission efficiency. This is because the magnetic fluxes that penetrate between the transmitter coil 1 and the receiver coil 2 decrease, and the mutual inductance M decreases as a consequence of a displacement in position between the transmitter coil 1 and the receiver coil 2. On the other hand, it can be understood that the fluctuations in the transmission efficiency are suppressed low by the effect of increasing the bandwidth in the power transfer system that includes the magnetic material 3 (FIG. 17) of the present embodiment. That is, it can be understood that the power transfer system of the present embodiment has such a particular advantageous effect as having a great tolerance to the positional misalignment.

Figure 18:
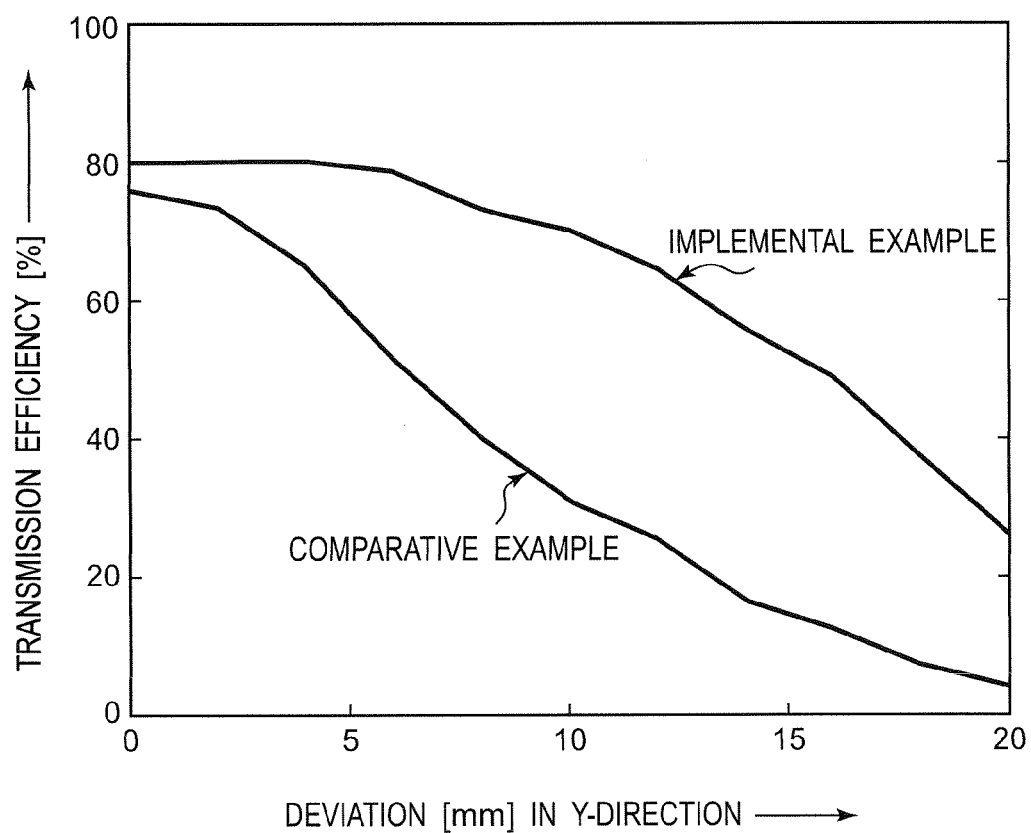
FIG. 18 is a graph showing characteristics of transmission efficiency with respect to the positional misalignment of the power transfer system of FIG. 11.

FIG. 18 is a graph showing a characteristic of transmission efficiency with respect to the positional misalignment of the power transfer system of FIG. 11. The configuration of the power transfer system is similar to that shown in FIGS. 11 to 14, and the operating frequency is 680 kHz. For example, when a range in which the transmission efficiency becomes equal to or larger than 60% is obtained, the comparative example (with no magnetic material) is tolerant of a displacement of up to 5 mm, and the implemental example is tolerant of a positional misalignment up to 13 mm. It can be understood that the power transfer system of the present embodiment has a great tolerance to the positional misalignment of the transmitter coil 1 and the receiver coil 2.

The fact that the tolerance to the positional misalignment is increased means that the relative change of the coupling coefficient is small even if the transmitter coil 1 and the receiver coil 2 are misaligned in position.

Figure 19:
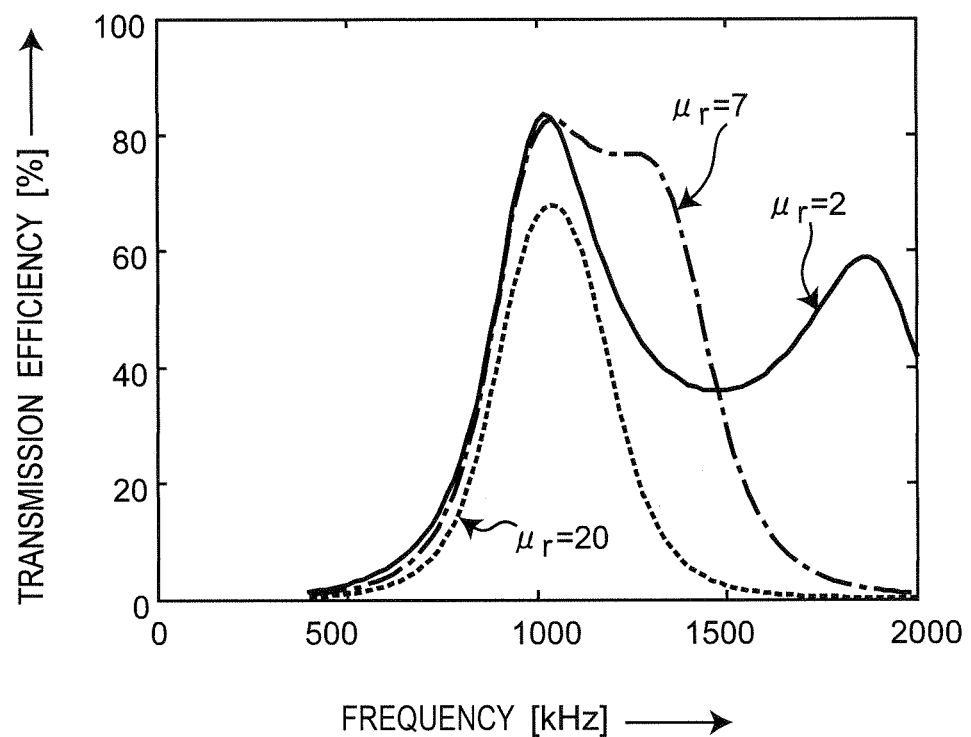
FIG. 19 is a graph showing frequency characteristics of transmission efficiency when a relative permeability of the magnetic material 3 is changed in the power transfer system of FIG. 11.
Figure 20:
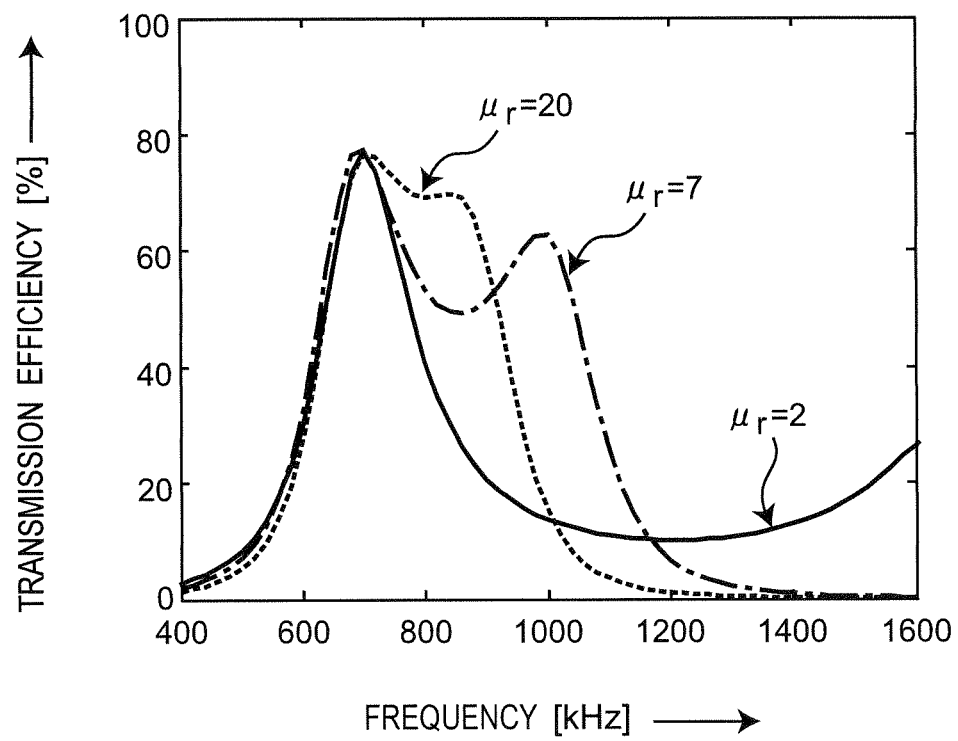
FIG. 20 is a graph showing frequency characteristics of transmission efficiency when the relative permeability of the magnetic material 3 is changed in the power transfer system of FIG. 11 in which the thickness of the magnetic material 3 is reduced.
Figure 21:
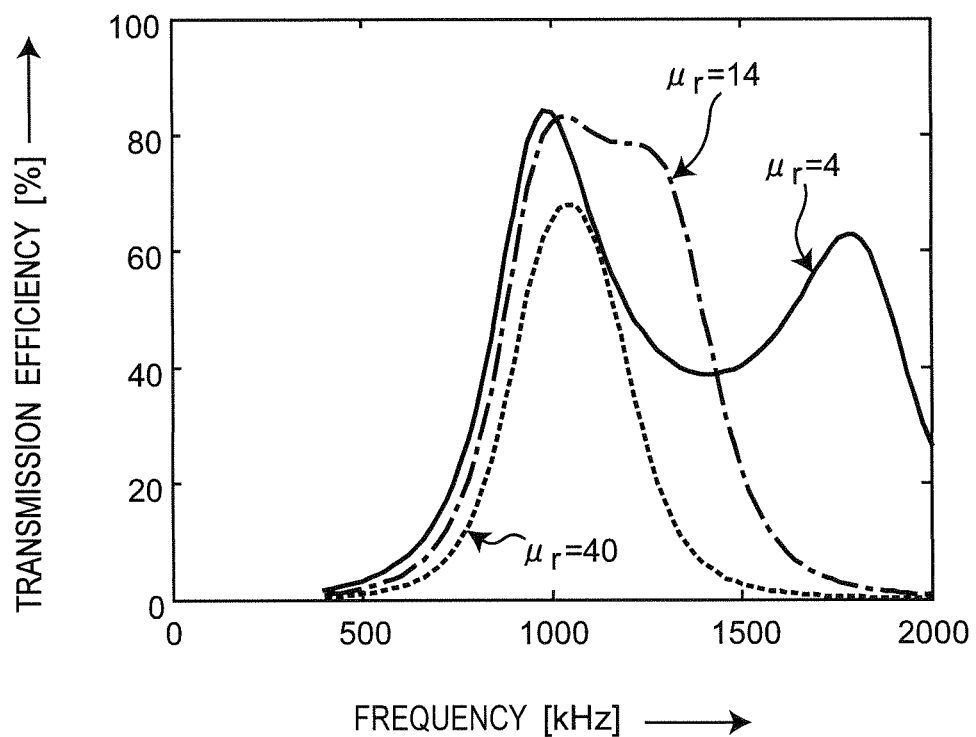
FIG. 21 is a graph showing frequency characteristics of transmission efficiency when the relative permeability of the magnetic material 3 is changed in the power transfer system of FIG. 11 in which the thickness of the magnetic material 3 is reduced.

Next, a characteristic when the relative permeability of the magnetic material 3 is changed in the power transfer system of the present embodiment is described with reference to FIGS. 19 to 21. In FIGS. 19 to 21, the configuration of the power transfer system is similar to that shown in FIGS. 11 to 14 except for the thickness (equal to the distance between the transmitter coil 1 and the receiver coil 2) and the relative permeability of the magnetic material 3. It is noted that the capacitors C3 and C4 have a capacitance of 10 nF.

FIG. 19 is a graph showing a frequency characteristic of transmission efficiency when the relative permeability of the magnetic material 3 is changed in the power transfer system of FIG. 11. In the case of FIG. 19, the thickness of the magnetic material 3 is 2 mm. According to FIG. 19, a double-peaked characteristic is exhibited when the relative permeability $\mu_r=2$, whereas a wide-band characteristic is exhibited with the transmission efficiency maintained when the relative permeability $\mu_r=7$, and a single-peaked characteristic is exhibited when the relative permeability $\mu_r=20$ with the transmission efficiency decreased. Therefore, it can be confirmed that an optimal relative permeability $\mu_r$ exists. FIG. 20 is a graph showing a frequency characteristic of transmission efficiency when the relative permeability of the magnetic material 3 is changed in the power transfer system of FIG. 11 in which the thickness of the magnetic material 3 is reduced. In the case of FIG. 20, the thickness of the magnetic material 3 was 1 mm, and the relative permeability $\mu_r$ identical to the value in the case of FIG. 19 was used for the sake of comparison. By reducing the thickness of the magnetic material 3, the coupling coefficient k between the transmitter coil 1 and the receiver coil 2 increases. Although the optimal characteristic was obtained when the relative permeability $\mu_r=7$ in the case of FIG. 19, it does not hold when the thickness of the magnetic material 3 is changed. FIG. 21 is a graph showing a frequency characteristic of transmission efficiency when the relative permeability of the magnetic material 3 is changed in the power transfer system of FIG. 11 in which the thickness of the magnetic material 3 is reduced. Also, in the case of FIG. 21, the thickness of the magnetic material 3 was 1 mm, whereas a relative permeability different from those of FIGS. 19 and 20 was used. According to FIG. 21, it can be understood that, when the thickness of the magnetic material 3 is reduced, a wide-band operation similar to that before the reduction in thickness can be achieved by using a magnetic material having a great relative permeability (e.g., $\mu_r=14$). As described above, the power transfer system of the present embodiment has such an particular advantageous effect that the same system can cope with thickness reduction by improving the relative permeability. Reducing the thickness of the magnetic material 3 leads to reductions in cost and weight.

Figure 23:
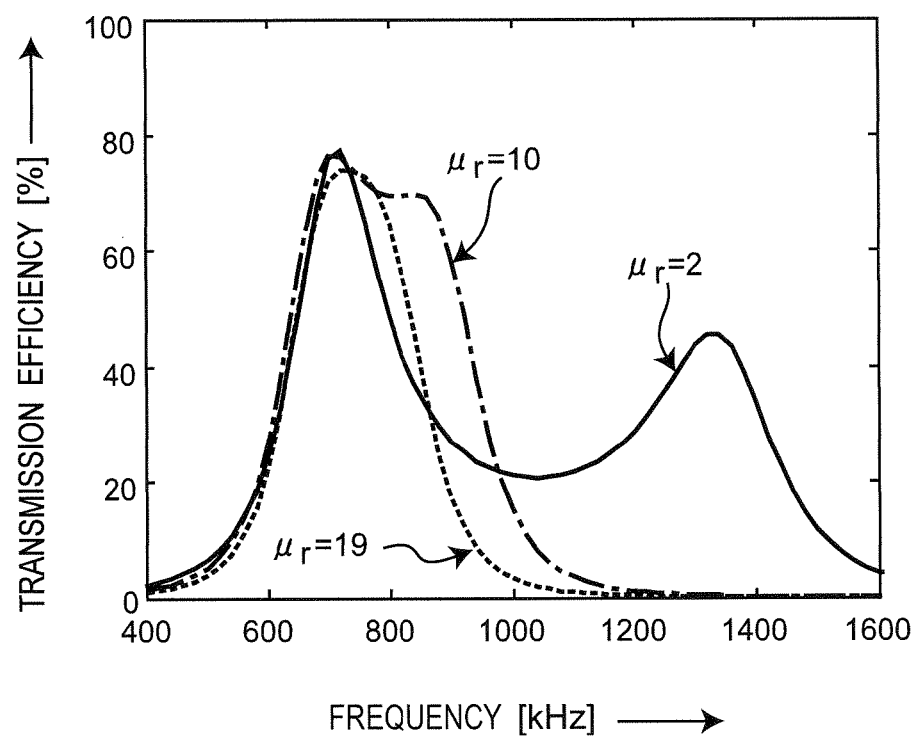
FIG. 23 is a graph showing frequency characteristics of transmission efficiency when the relative permeability of the magnetic material 3 is changed in the power transfer system of FIG. 22 from which a cavity is removed.
Figure 24:
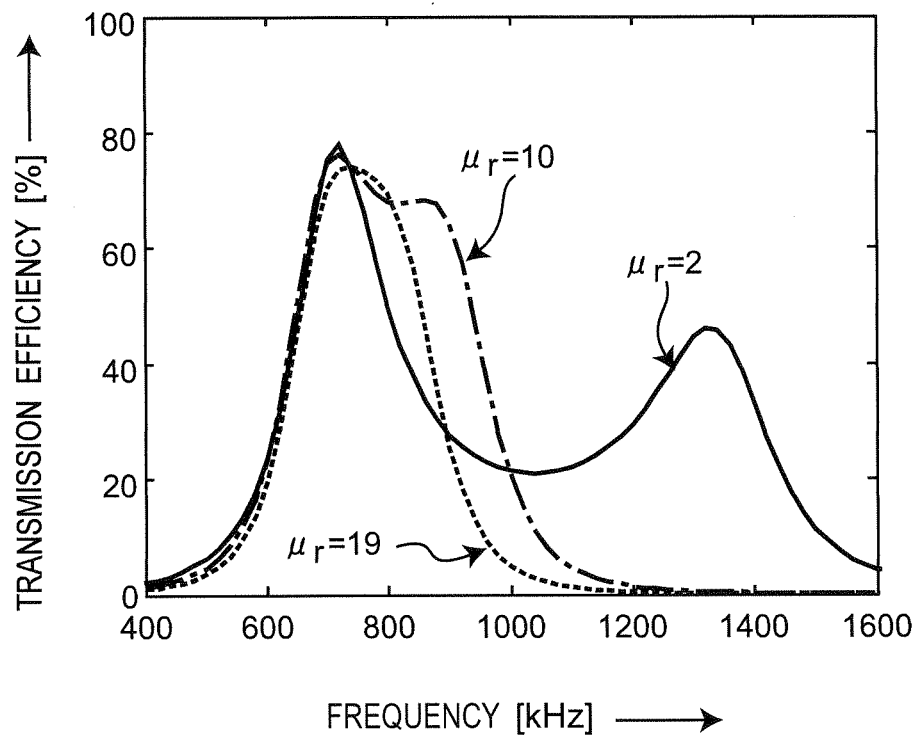
FIG. 24 is a graph showing frequency characteristics of transmission efficiency when the relative permeability of the magnetic material 3 is changed in the power transfer system of FIG. 22.

Next, a characteristic when a cavity is provided at the magnetic material 3 in the power transfer system of the present embodiment is described with reference to FIGS. 22 to 24.

Figure 22:
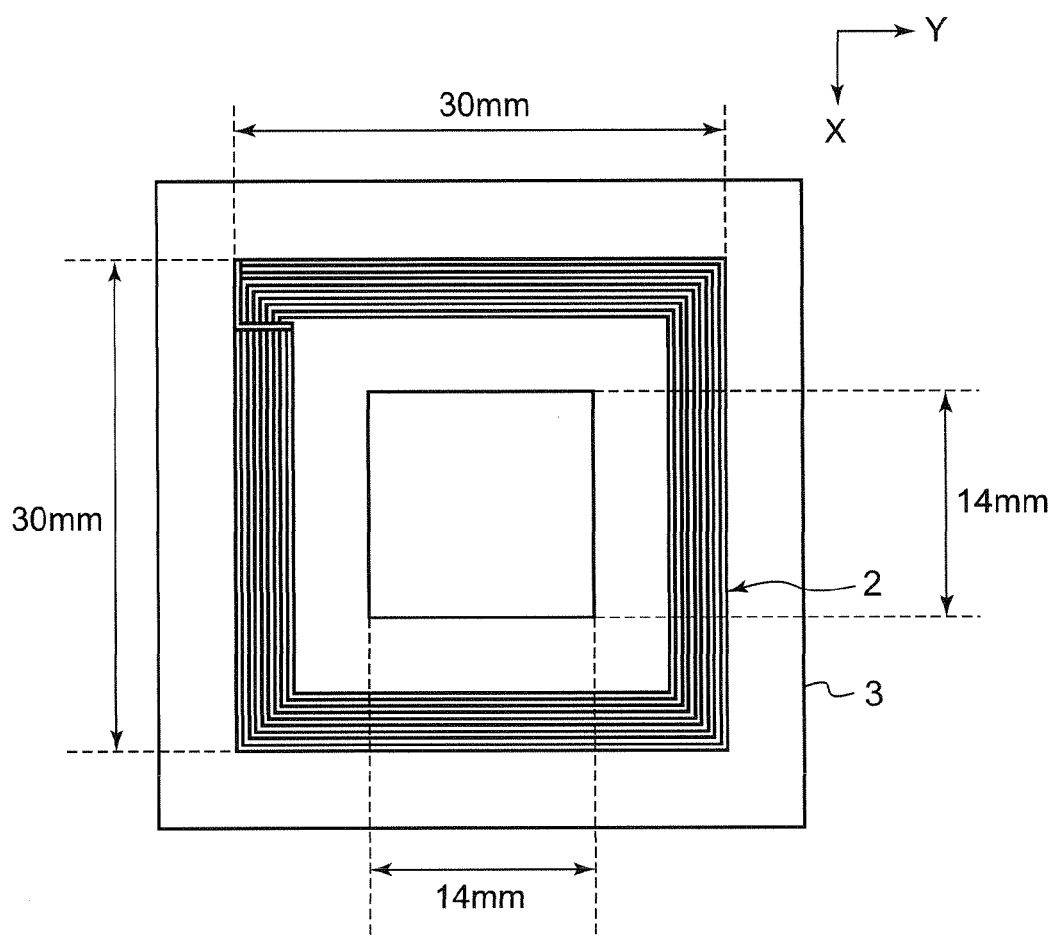
FIG. 22 is a top view showing a schematic configuration of a power transfer system according to a second implemental example of the present disclosure.

FIG. 22 is a top view showing a schematic configuration of a power transfer system according to the second implemental example of the present disclosure. The power transfer system of FIG. 22 has a configuration similar to that of the power transfer system shown in FIGS. 11 to 14 except that a cavity is provided at the magnetic material 3. The dimensions of the cavity are 14×14 mm. FIG. 23 is a graph showing a frequency characteristic of transmission efficiency when the relative permeability of the magnetic material 3 is changed in the power transfer system of FIG. 22 in which the cavity is removed. FIG. 24 is a graph showing a frequency characteristic of transmission efficiency when the relative permeability of the magnetic material 3 is changed in the power transfer system of FIG. 22. By comparing the graphs of FIG. 23 and FIG. 24 with each other, it can be understood that substantially similar characteristics can be obtained regardless of the existence of the cavity. In the power transfer system of the present embodiment, the magnetic material 3 needs only to be provided adjacent to the transmitter coil 1 and the receiver coil 2 so as to cover at least one part of the region in which at least the windings of the transmitter coil 1 and the receiver coil 2 exist. Providing the cavity at the magnetic material 3 leads to reductions in cost and weight.

Next, a further implemental example of the power transfer system of the present embodiment is described with reference to FIGS. 25 to 27.

Figure 25:
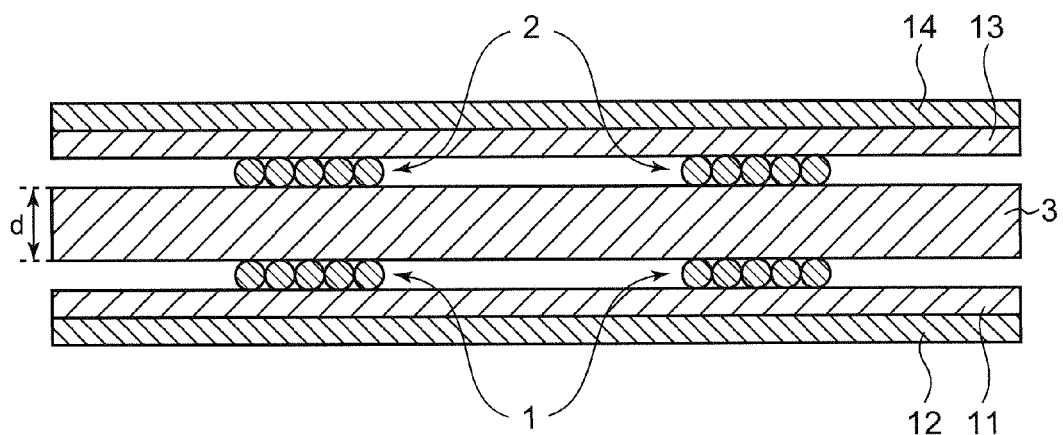
FIG. 25 is a sectional view showing a schematic configuration of a power transfer system according to a third implemental example of the present disclosure.
Figure 26:
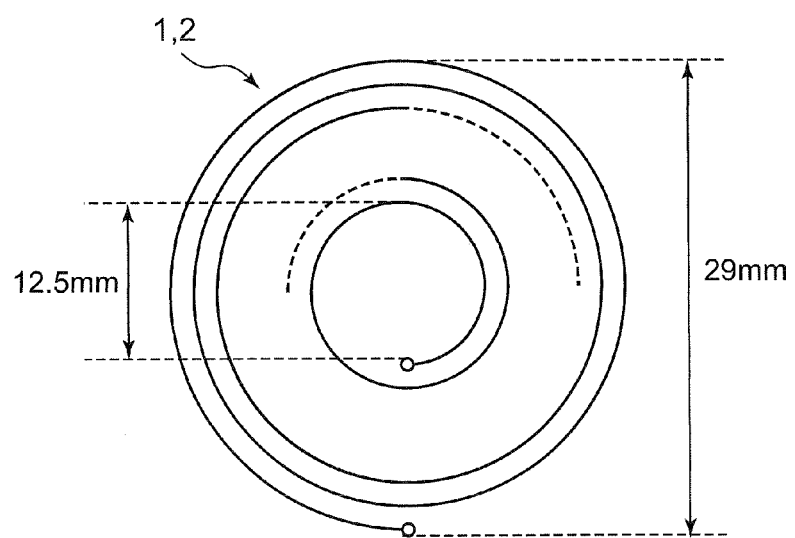
FIG. 26 is a plan view showing a transmitter coil 1 and a receiver coil 2 of FIG. 25.

FIG. 25 is a sectional view showing a schematic configuration of a power transfer system according to the third implemental example of the present disclosure. FIG. 26 is a plan view showing a transmitter coil 1 and a receiver coil 2 of FIG. 25. A magnetic material 11 and a metal shield 12 are provided for shielding below the transmitter coil 1, and a magnetic material 13 and a metal shield 14 are provided for shielding also above the receiver coil 2. The magnetic materials 11 and 13 and the metal shields 12 and 14 have a thickness of 0.1 mm. The shield has the advantageous effects of reducing leakage electromagnetic fields and reducing influences on the peripheral units. The magnetic material 3 has a relative permeability of 10, and the magnetic materials 11 and 13 have a relative permeability of 1000. As shown in FIG. 26, the transmitter coil 1 and the receiver coil 2 are circular coils that have an outer diameter of 29 mm, an inner diameter of 12.5 mm, and a number of turns of 17. The windings of the transmitter coil 1 and the receiver coil 2 have a width of 0.48 mm and a thickness of 0.3 mm, and each of the transmitter coil 1 and the receiver coil 2 has an inductance of 11.7 µH and a series resistance of 0.4Ω.

FIG. 27 is a graph showing a frequency characteristic of the transmission efficiency of the power transfer system of FIG. 25. The graph of FIG. 27 shows results obtained by actual measurements. Simulations were carried out for the following cases: a case (solid line) of the distance d=2.6 mm between the transmitter coil 1 and the receiver coil 2 with the magnetic material; a comparative case (alternate long and short dash line) of the distance d=2.6 mm with no magnetic material; and a case (dotted line) of the distance d=7.5 mm with no magnetic material. It is assumed that the thickness of the magnetic material 3 is equal to the distance d. In the case of "d=2.6 mm with no magnetic material", the transmitter coil 1 and the receiver coil 2 are adjacent to be each other so as to be electromagnetically strongly coupled to each other, and therefore, any wide band operation cannot be achieved although the transmission efficiency is maximized at a frequency of 150 kHz. In the case of "d=7.5 mm with no magnetic material", the mutual inductance decreases due to the fact that the transmitter coil 1 and the receiver coil 2 are separated to be apart from each other, and therefore, the coupling coefficient can be decreased, consequently allowing the wide band operation to be achieved. However, in the case, the frequency at which the transmission efficiency becomes maximized increases to 250 kHz. That is, the power transfer system is substantially increased in size. On the other hand, in the case of "d=2.6 mm with the magnetic material", namely, the frequency characteristic of the transmission efficiency of the power transfer system of the implemental example becomes maximized at 150 kHz, and it can be understood that the bandwidth of transmission efficiency (e.g., bandwidth in which the transmission efficiency becomes equal to or larger than 60%) also has a wide band achieved by comparison with the case of "d=2.6 mm with no magnetic material". Moreover, by comparison with the case of "d=7.5 mm with no magnetic material", the frequency at which the transmission efficiency becomes maximized is lowered. From the above results, the power transfer system of the present embodiment has such particular advantageous effects that an increase in the bandwidth and a reduction in size can be concurrently achieved.

Several applications of the present disclosure are described below.

Figure 28:
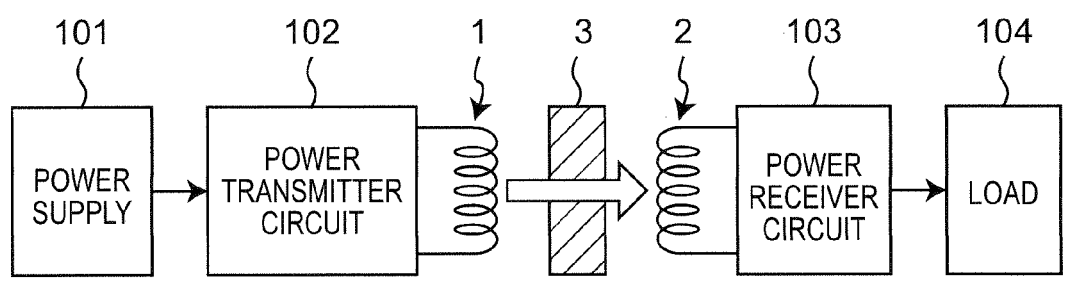
FIG. 28 is a block diagram showing a schematic configuration of the power transfer system of the first embodiment of the present disclosure.

FIG. 28 is a block diagram showing a schematic configuration of the power transfer system according to the first embodiment of the present disclosure. A power transfer system including the noncontact connector system as described above can be configured. It is assumed that the power transfer system is configured to include a power transfer apparatus on the power transmitter side on which the noncontact connector apparatus on the transmitter side is provided, and a power transfer apparatus on the power receiver side on which the noncontact connector apparatus on the receiver side is provided. Referring to FIG. 28, in the power transfer apparatus on the power transmitter side, the transmitter coil 1 (FIG. 1) is connected to a power transmitter circuit 102, and the power transmitter circuit 102 is connected to a power supply 101. In the power transfer apparatus on the power receiver side, the receiver coil 2 (FIG. 1) is connected to a power receiver circuit 103, and the power receiver circuit 103 is connected to a load 104 (e.g., a battery or the like). When power is supplied to the transmitter coil 1, a current flows in the transmitter coil 1, and an induced electromotive force is generated in the receiver coil 2 by electromagnetic fields in the peripheries of the transmitter coil 1 formed by the current, then an induced current flows in the receiver coil 2. By taking out this induced current by the load 104, the electric power can be transferred between the transmitter coil 1 and the receiver coil 2.

Figure 29:
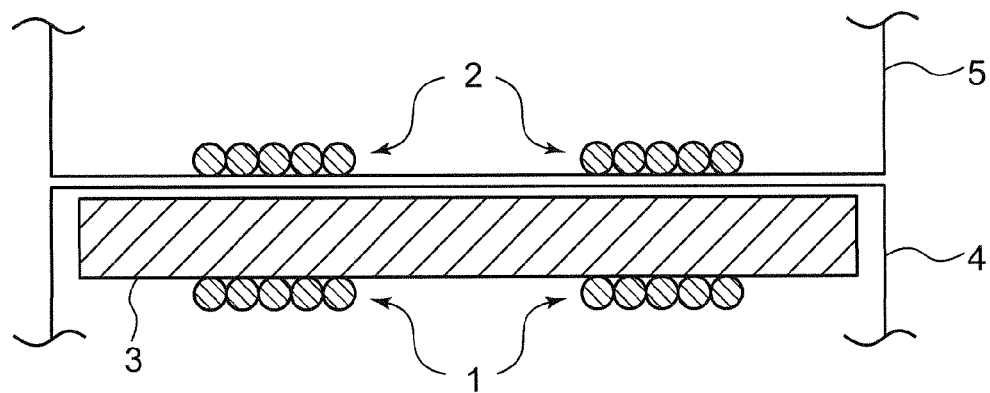
FIG. 29 is a sectional view showing a configuration of a power transfer apparatus on the power transmitter side and a power transfer apparatus on the power receiver side in the power transfer system of FIG. 25.

FIG. 29 is a sectional view showing a configuration of the power transfer apparatus on the power transmitter side and the power transfer apparatus on the receiver side in the power transfer system of FIG. 25. In a case where the power transfer system of the present embodiment (e.g., wireless charging or the like) is implemented, it is beneficial to provide the transmitter coil 1 and the magnetic material 3 on the inside of the casing 4 of the power transfer apparatus (charger) on the power transmitter side, and provide only the receiver coil 2 on the inside of the casing 5 of the power transfer apparatus (which is a device to be charged) on the power receiver side. The receiver coil 2 is provided so that the winding is wound around a predetermined region of the magnetic material 3 on the plane (second plane) opposed to the plane (first plane) on the side where the transmitter coil 1 is provided when the power transfer apparatus on the power receiver side is put to be adjacent to the power transfer apparatus on the power transmitter side. When the power transfer is not performed, the receiver coil 2 is located to be apart from the transmitter coil 1 and the magnetic body 3. When power transfer is performed by putting the power transfer apparatus on the power receiver side to be adjacent to the power transfer apparatus on the power transmitter side, the receiver coil 2 is put to be adjacent to the magnetic body 3 so as to cover at least one part of the region in which the winding of the receiver coil 2 exists, and the self-inductance of the receiver coil 2 is increased by putting the receiver coil 2 to be adjacent to the magnetic body 3. Subsequently, an operation is performed in a manner similar to that of the case described with reference to FIG. 1 and so on.

Figure 30:
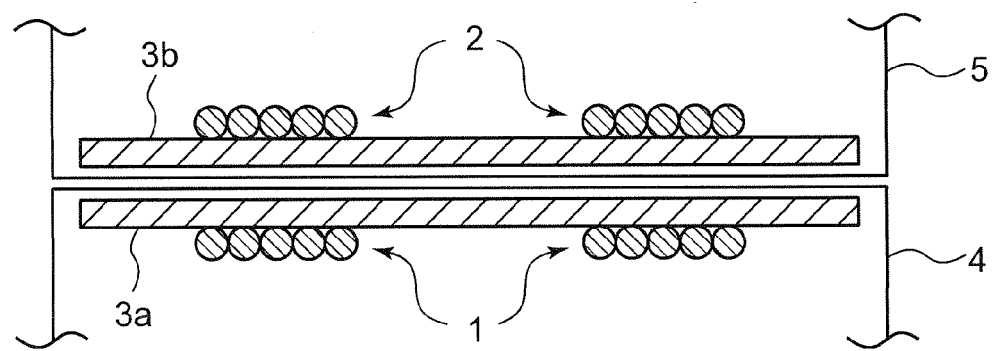
FIG. 30 is a sectional view showing a configuration of a modified embodiment of the power transfer apparatus on the power transmitter side and the power transfer apparatus on the power receiver side in the power transfer system of FIG. 25.

FIG. 30 is a sectional view showing a configuration of a modified embodiment of the power transfer apparatus on the power transmitter side and the power transfer apparatus on the power receiver side in the power transfer system of FIG. 25. Magnetic bodies may be provided for both of the power transfer apparatus on the power transmitter side and the power transfer apparatus on the power receiver side. In the power transfer system of FIG. 30, a transmitter coil 1 and a magnetic body 3a are provided in the casing 4 of the power transfer apparatus on the power transmitter side, and only a magnetic body 3b and a receiver coil 2 are provided in the casing 5 of the power transfer apparatus on the power receiver side. When the power transfer is not performed, the receiver coil 2 is located to be apart from the transmitter coil 1. When the power transfer is performed by putting the power transfer apparatus on the power receiver side to be adjacent to the power transfer apparatus on the power transmitter side, the receiver coil 2 is electromagnetically coupled to the transmitter coil 1. By increasing the self-inductances of the transmitter coil 1 and the receiver coil 2 with the magnetic bodies 3a and 3b, the coupling coefficient between the transmitter coil 1 and the receiver coil 2 can be set to be decreased so that the frequency characteristic of transmission efficiency from the transmitter coil 1 to the receiver coil 2 changes from a double-peaked narrow-band characteristic to a single-peaked wide-band characteristic. Subsequently, the same system operates in a manner similar to that of the case described with reference to FIG. 1 and so on.

In FIGS. 29 and 30, the casings 4 and 5 are made of, for example, a dielectric or an insulator such as ABS resin or rubber or both of them. It is also possible to configure at least one of the casings 4 and 5 made of a magnetic body. For example, by mixing magnetic body powders with the casing (dielectric), the relative permeability of the casing can be increased. Further, it is also possible to integrate the magnetic body 3 with the casing 4 or 5 made of a magnetic body. By integrating the magnetic body 3 with the casing 4 or 5, the power transfer system has such an effect that the same system can be reduced in thickness, and because of a reduction in the number of members, cost reduction and weight reduction can be expected.

According to the power transfer system of the present embodiment, power can be transferred with a stabilized transmission efficiency with a very simple configuration even if a positional misalignment occurs between the transmitter coil 1 and the receiver coil 2.

Second Embodiment

Figure 31:
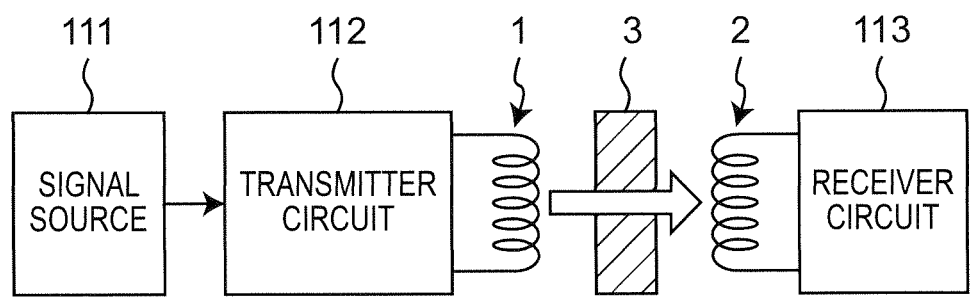
FIG. 31 is a block diagram showing a schematic configuration of a signal transmission system according to a second embodiment of the present disclosure.

FIG. 31 is a block diagram showing a schematic configuration of a signal transmission system according to the second embodiment of the present disclosure. It is acceptable to transmit a signal instead of transmitting power by using the noncontact connector system described above. It is defined that the signal transmission system is configured to include an information transmission apparatus on the transmitter side including a noncontact connector apparatus on the transmitter side, and an information transmission apparatus on the receiver side including a noncontact connector apparatus on the receiver side. Referring to FIG. 31, the transmitter coil 1 (FIG. 1) is connected to a transmitter circuit 112, and the transmitter circuit 112 is connected to a signal source 111 in the information transmission apparatus on the transmitter side. In the information transmission apparatus on the receiver side, the receiver coil 2 (FIG. 1) is connected to a receiver circuit 113. The information transmission apparatus on the transmitter side and the information transmission apparatus on the receiver side in the signal transmission system can be configured in a manner similar to that of the power transfer apparatus on the power transmitter side and the power transfer apparatus on the power receiver side shown in FIG. 29 or FIG. 30. According to the information transmission system of the present embodiment, information can be transmitted with a stabilized transmission efficiency with a very simple configuration even if a positional misalignment occurs between the transmitter coil 1 and the receiver coil 2.

Third Embodiment

Figure 32:
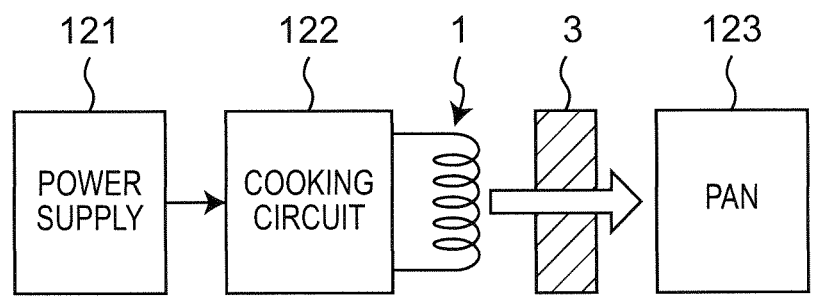
FIG. 32 is a block diagram showing a schematic configuration of an induction heating apparatus according to a third embodiment of the present disclosure.
Figure 33:
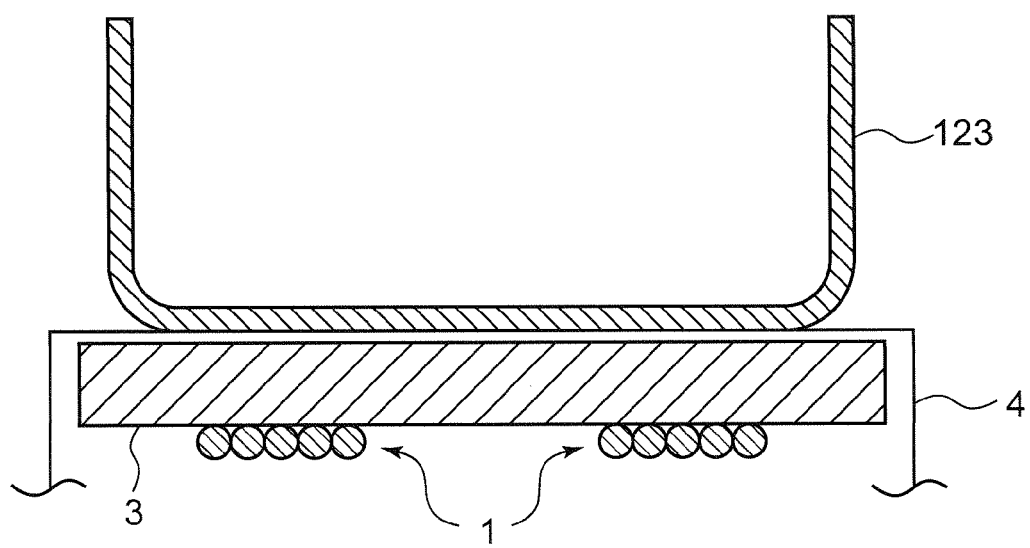
FIG. 33 is a sectional view showing a configuration of the induction heating apparatus and the pan 123 of FIG. 32.

FIG. 32 is a block diagram showing a schematic configuration of an induction heating apparatus according to the third embodiment of the present disclosure. FIG. 33 is a sectional view showing a configuration of the induction heating apparatus and the pan 123 of FIG. 32. An induction heating apparatus can be configured by using the principle of the power transfer system described above.

Referring to FIG. 32, the transmitter coil 1 (FIG. 1) as an induction heating coil is connected to a cooking circuit 122, and the cooking circuit 122 is connected to a power supply 121 in the induction heating apparatus. Further, a cooking container for induction heating such as the pan 123 is provided in place of the receiver coil 2 of FIG. 1. The pan 123 is provided adjacent to the transmitter coil 1 so as to be electromagnetically coupled to the transmitter coil 1. When a current flows in the transmitter coil 1 due to electromagnetic coupling between the transmitter coil 1 and the pan 123, an induced electromotive force is generated in the basal plane of the pan 123 due to electromagnetic fields in the peripheries of the transmitter coil 1 formed by the current, and an induced eddy current flows in the basal plane of the pan 123. Since this eddy current can be equivalently regarded as a lossy coil, the self-inductance of the pan 123 and a mutual inductance between the transmitter coil 1 and the pan 123 can be defined. The transmitter coil 1 is provided along a first plane so that a winding is wound around a predetermined region on the horizontal first plane. The induction heating apparatus is configured to include a magnetic body 3, that is provided between the first plane and a second plane which is located above to be opposed and to be adjacent to the first plane and in which the basal plane of the pan 123 is located. The magnetic body 3 is provided to be adjacent so as to be electromagnetically coupled to the transmitter coil 1 and the basal plane of the pan 123 throughout a region in which at least the winding of the transmitter coil 1 and the basal plane of the pan 123 exist between the first plane and the second plane. The self-inductance of the transmitter coil 1 is increased by putting the magnetic body 3 to be adjacent to the transmitter coil 1, and the self-inductance of the pan 123 is increased by putting the magnetic body 3 to be adjacent to the basal plane of the pan 123.

The induction heating apparatus of the present embodiment is characterized in that the coupling coefficient between the transmitter coil 1 and the pan 123 is set to be decreased by increasing the self-inductance of each of the transmitter coil 1 and the pan 123 so that the frequency characteristic of the transmission efficiency from the transmitter coil 1 to the pan 123 changes from a double-peaked narrow-band characteristic to a single-peaked wide-band characteristic. According to the induction heating apparatus of the present embodiment, the pan 123 can be heated with a stabilized transmission efficiency with a very simple configuration even if a positional misalignment occurs between the transmitter coil 1 and the pan 123.

Modified Embodiments

Modified embodiments of the embodiments of the present disclosure are described with reference to FIGS. 34 to 36.

Although the winding of the transmitter coil 1 is wound in a single layer along the first plane, and the winding of the receiver coil 2 is wound in a single layer along the second plane in the embodiments and the implemental examples described with reference to FIG. 1 and so on, the windings may be wound in a plurality of layers.

Figure 34:
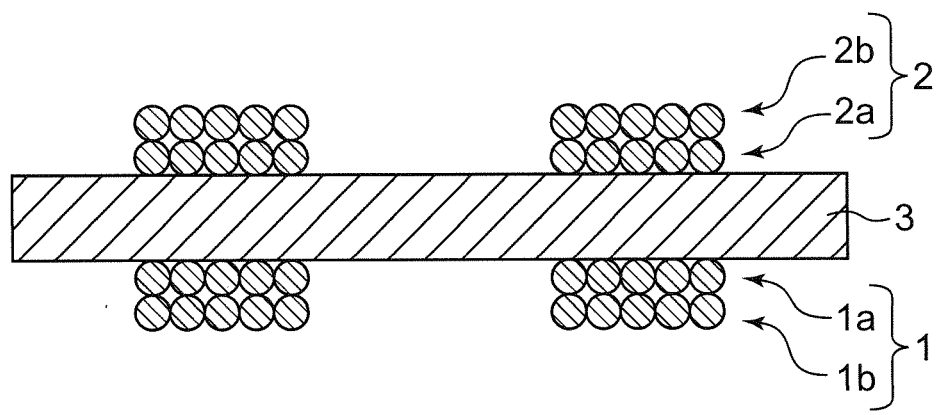
FIG. 34 is a sectional view showing a modified embodiment of the transmitter coil 1 and the receiver coil 2 of FIG. 1.
Figure 35:
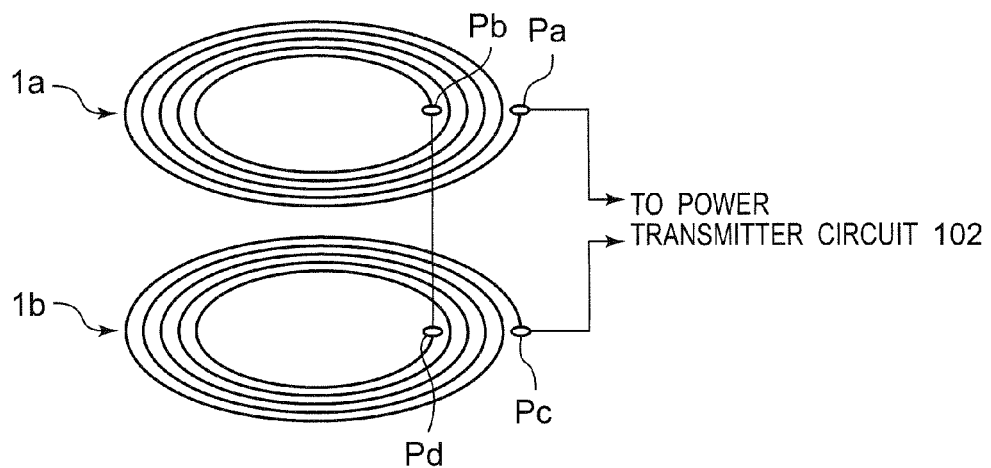
FIG. 35 is a schematic diagram for explaining a winding method of the transmitter coil 1 of FIG. 34.

FIG. 34 is a sectional view showing a modified embodiment of the transmitter coil 1 and the receiver coil 2 of FIG. 1. FIG. 35 is a schematic diagram for explaining a winding method of the transmitter coil 1 of FIG. 34. In FIGS. 34 and 35, a case where the transmitter coil 1 and the receiver coil 2 are each wound in two layers is shown. The windings 1a and 1b of the layers of the transmitter coil 1 are wound in directions opposite to each other, and the windings 1a and 1b are connected in series to each other by connecting them at terminals Pb and Pd. By connecting the windings 1a and 1b in series, the modified embodiment has such an effect that the inductance of the transmitter coil 1 can be increased. The same thing can be said for the receiver coil 2.

Figure 36:
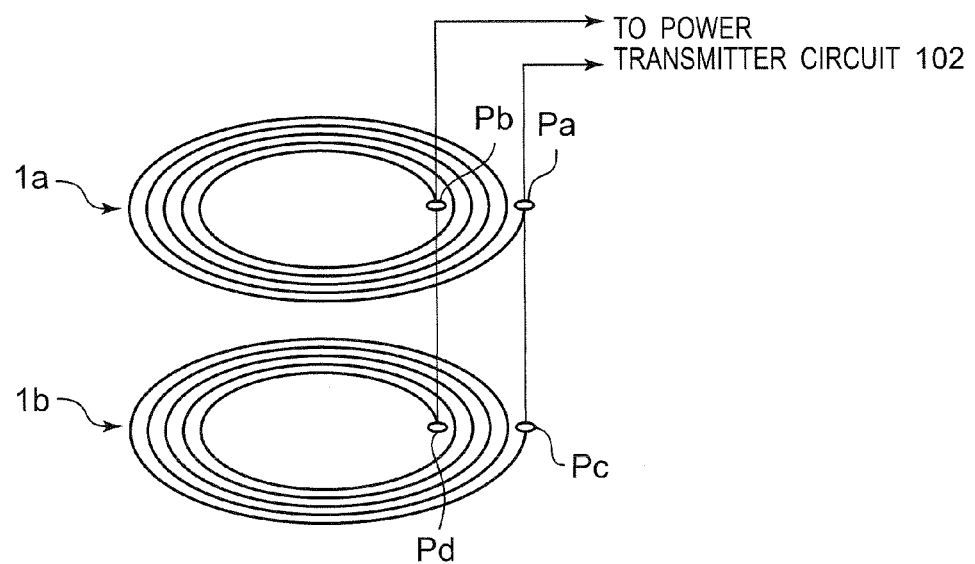
FIG. 36 is a schematic diagram for explaining a modified embodiment of the winding method of the transmitter coil 1 of FIG. 34.

FIG. 36 is a schematic diagram for explaining a modified embodiment of the winding method of the transmitter coil 1 of FIG. 34. The windings 1a and 1b of the layers of the transmitter coil 1 are wound in an identical direction, and the windings 1a and 1b are connected in parallel to each other by connecting them at terminals Pa and Pc and further connecting them at terminals Pb and Pd. By connecting the windings 1a and 1b in parallel, the modified embodiment has such an effect that the resistance of the transmitter coil 2 can be reduced.

It is noted that the total length of each of the transmitter coil 1 and the receiver coil 2 needs to be drastically shortened with respect to the operating wavelength.

At least one of the transmitter coil 1 and the receiver coil 2 may be wound in a plurality of layers. Moreover, both or at least one of the transmitter coil 1 and the receiver coil 2 may be wound in three or more layers.

Figure 37:
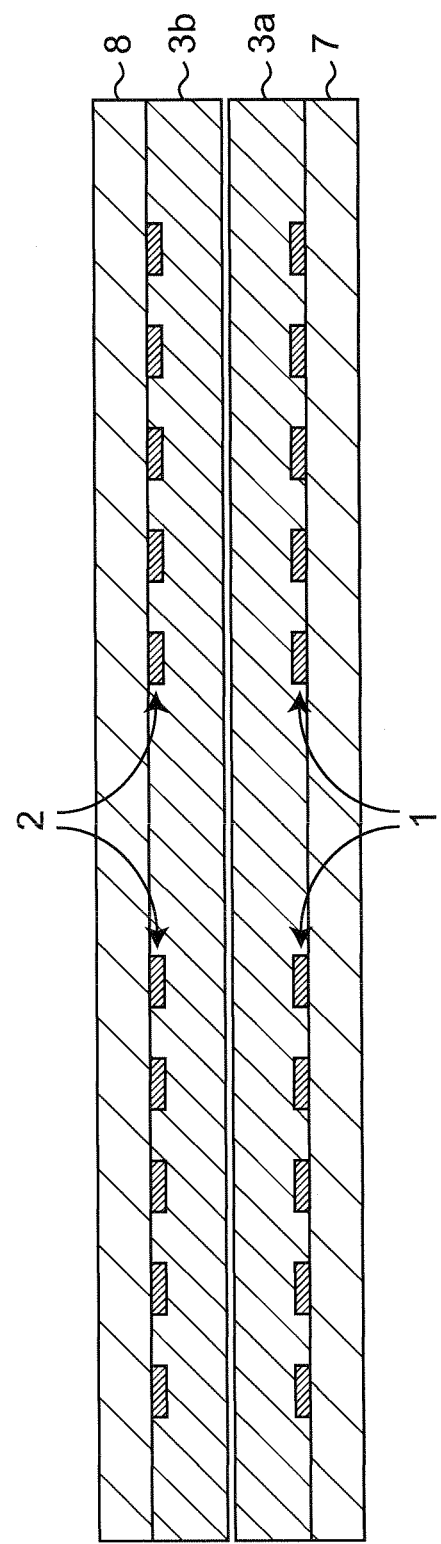
FIG. 37 is a sectional view showing a modified embodiment of the noncontact connector apparatuses on the transmitter side and the power receiver side of FIG. 1.

FIG. 37 is a sectional view showing a modified embodiment of the noncontact connector apparatus on the transmitter side and the receiver side of FIG. 1. The noncontact connector apparatus may be formed on a printed wiring board. In this case, the transmitter coil 1 and the receiver coil 2 are formed as respective conductor patterns on dielectric substrates 7 and 8. A magnetic body 3a is applied onto the transmitter coil 1 and the dielectric substrate 7, and a magnetic body 3b is applied onto (lower surface of the dielectric substrate 8 in FIG. 37) the receiver coil 2 and the dielectric substrate 8. By thus integrally forming the transmitter coil 1 and the receiver coil 2 on the printed wiring board with the magnetic bodies 3a and 3b, a high-strength low-cost noncontact connector apparatus can be provided. Moreover, it is acceptable to integrally form the transmitter coil 1 or the receiver coil 2 on the printed wiring board with the magnetic body in at least one of the noncontact connector apparatuses on the transmitter side and the receiver side.

Moreover, although the capacitors for impedance matching, with which the transmitter coil 1 and the receiver coil 2 are loaded, are connected in parallel with the transmitter coil 1 and the receiver coil 2 in FIG. 14, they may be connected in series as shown in FIG. 4. Moreover, another impedance matching circuit may also be used.

The principle of operation of the present disclosure is complemented here. Considering a case where radio waves are radiated from a transmitting antenna to a receiving antenna as a comparison to the present disclosure, the bandwidth does not change even if a relative relation between the antennas changes since the transmitting antenna and the receiving antenna are separated to be apart from each other and are put in an electromagnetically uncoupled state. However, since the transmitter coil and the receiver coil are adjacent to each other so as to be electromagnetically coupled to each other in the noncontact connector system, the bandwidth fluctuates in accordance with the coupling state. Therefore, if a narrow-band design is unfortunately made, the frequency at which the transmission efficiency becomes maximized shifts even with a slight change in the distance between the transmitter coil and the receiver coil, and the transmission efficiency disadvantageously decreases as a result. In the noncontact connector system described in the embodiments of the present disclosure, wide band operation is achieved by providing the magnetic body 3 between the transmitter coil 1 and the receiver coil 2, and fluctuations in the transmission efficiency can be suppressed even if the frequency at which the transmission efficiency becomes maximized changes due to some positional misalignment as a result (See FIG. 17). By thus achieving the wide band operation, the transmission efficiency can be maintained at the desired frequency even when a positional misalignment occurs between the transmitter coil 1 and the receiver coil 2.

Prior arts include one in which a magnetic body is provided between the transmitter coil and the receiver coil, and, for example, the invention disclosed in the Patent Document 1 has been known. However, since the invention of the Patent Document 1 uses the magnetic body in order to increase the coupling coefficient between the transmitter coil and the receiver coil in a manner similar to that of FIG. 8 of the present application, it is quite different from the purpose of using the magnetic body in the present disclosure, i.e., using the same magnetic body for decreasing the coupling coefficient by increasing the self-inductance of each of the transmitter coil 1 and the receiver coil 2. The magnetic body used in the invention of the Patent Document 1 has a high relative permeability in order to increase the coupling coefficient. On the other hand, the magnetic body used in the present disclosure is able to have a comparatively small relative permeability.

Fourth Embodiment

Figure 38:
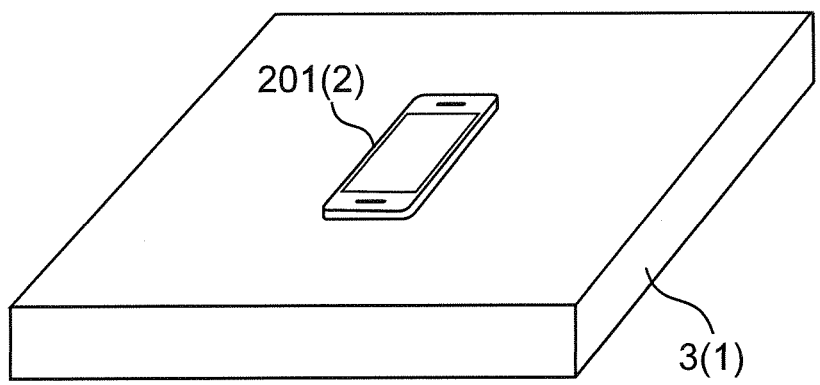
FIG. 38 is a perspective view showing a schematic configuration of a power transfer system according to a fourth embodiment of the present disclosure.

FIG. 38 is a perspective view showing a schematic configuration of a power transfer system according to the fourth embodiment of the present disclosure. In FIG. 38, a power transmitter circuit according to the embodiment includes a magnetic body 3 having a transmitter coil 1 may charge or feed electric power to a power receiver circuit according to an embodiment in, for example, a smart phone 201 or another portable telephone including a receiver coil 2.

Fifth Embodiment

Figure 39:
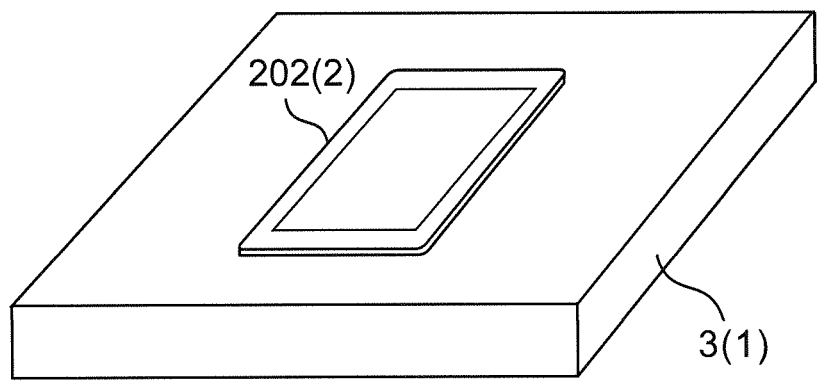
FIG. 39 is a perspective view showing a schematic configuration of a power transfer system according to a fifth embodiment of the present disclosure.

FIG. 39 is a perspective view showing a schematic configuration of a power transfer system according to the fifth embodiment of the present disclosure. Referring to FIG. 39, a power transmitter circuit according to the embodiment that is configured to include a magnetic body 3 including a transmitter coil 1 may charge or feed electric power to a power receiver circuit according to an embodiment in, for example, tablet terminal device 202 or another information terminal apparatus including a receiver coil 2.

Figure 40:
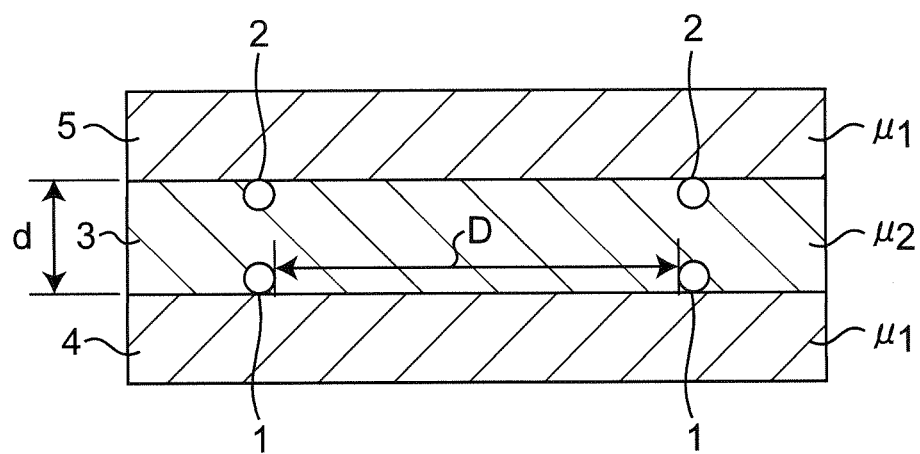
FIG. 40 is a vertical sectional view showing a schematic configuration of a power transfer system according to a fourth implemental example of the present disclosure.
Figure 41:
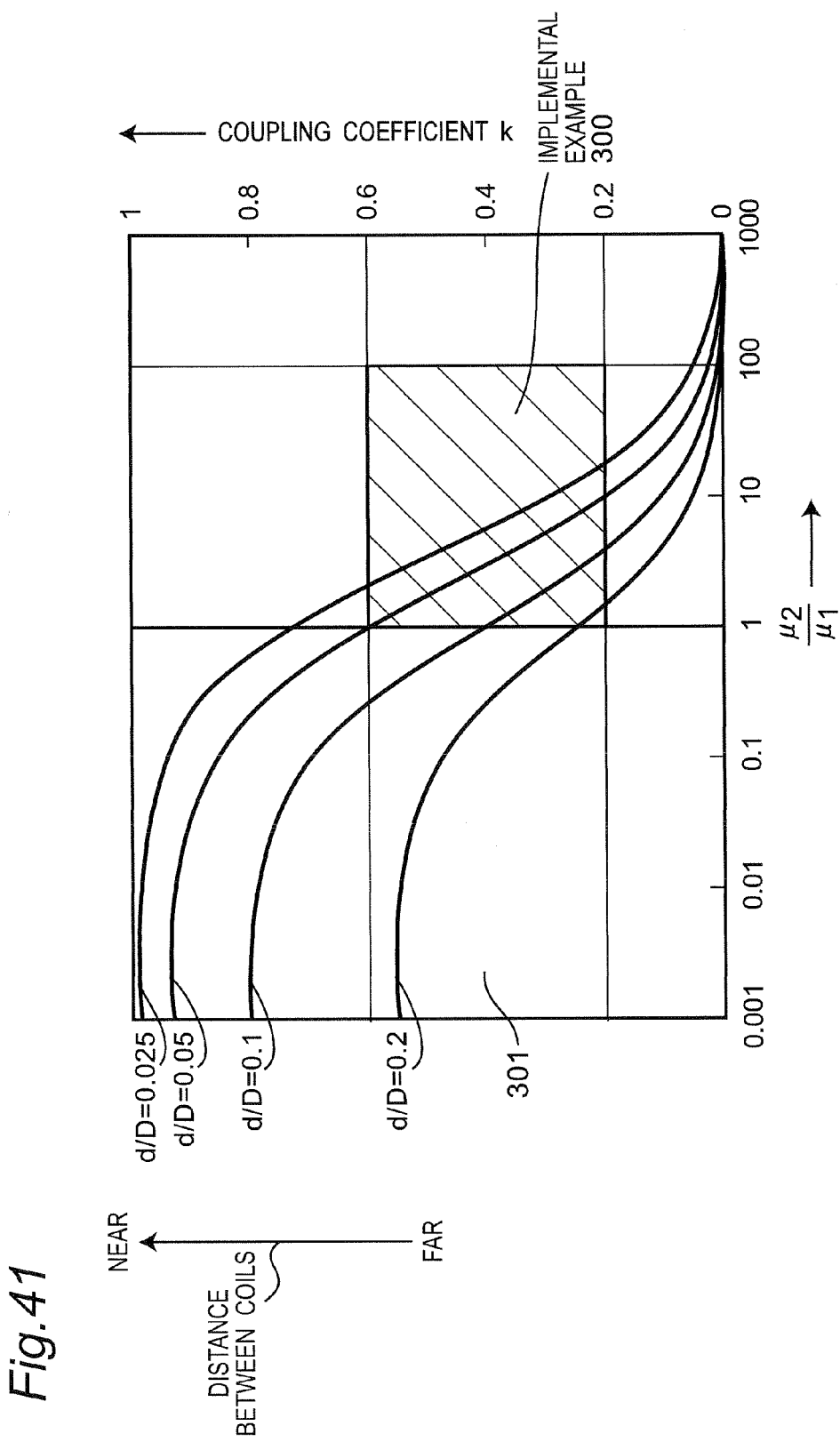
FIG. 41 is a graph showing characteristics of the coupling coefficient k with respect to a permeability ratio μ2/μ1 when a normalized inter-coil distance d/D is used as a parameter in the power transfer system of FIG. 40.

FIG. 40 is a vertical sectional view showing a schematic configuration of a power transfer system according to the fourth implemental example of the present disclosure. FIG. 41 is a graph showing a characteristic of the coupling coefficient k with respect to a magnetic permeability ratio of $\mu2/\mu1$ when a normalized inter-coil distance d/D is used as a parameter in the power transfer system of FIG. 40. A concrete design example is described below with reference to FIGS. 40 and 41.

FIG. 40 shows only the outermost peripheries of the transmitter coil 1 and the receiver coil 2 each having the same number of turns, and the internal diameter of the outer periphery is assumed to be D. Moreover, a magnetic body 3 having a thickness "d" and a magnetic permeability "$\mu2$" is interposed between the casings 4 and 5 each having a magnetic permeability "$\mu1$".

Generally speaking, in the power transfer system configured as above, efficiency $\eta=|S21|^2$ can be determined by a product of the coupling coefficient k and the Q values of the coils 1 and 2. In the power transfer system, high efficiency is an indispensable factor, and it is beneficial that kQ>20 in concrete to achieve an efficiency equal to or larger than 90%. For example, when coils 1 and 2 with Q=100 or less are used, it is beneficial that the coupling coefficient should be equal to or larger than 0.2 in order to achieve kQ>20. However, since the double-peaked narrow-band characteristic is exhibited as described above when the coupling coefficient is excessively strong, it is beneficial that the coupling coefficient should be equal to or smaller than 0.6 in order to achieve a wide band.

In view of the above, design is made to determine the magnetic permeability of the magnetic body 3 between the coils 1 and 2 so that $0.2 \leq k \leq 0.6$ is achieved with regard to the coupling coefficient k. Upon determining the magnetic permeability $\mu1$ of the casings 4 and 5, it is beneficial to select different values depending on the magnetic permeability $\mu2$ of the magnetic body 3 that is the shield member placed on the rear side of the coils 1 and 2. In this case, the magnetic body 3 of the shield member is placed for the purpose of reducing leakage electromagnetic fields to the adjacent electronic device and the like. A concrete design example is described below.

Those who provide the present disclosure calculated by simulations the diameter D mm, the number of turns 1, and the coupling coefficient k between the coils 1 and 2 of the inter-coil distance d as shown in FIG. 40. It is assumed that the magnetic permeability of the magnetic body 3 on the rear side of the coils 1 and 2 is $\mu1$, and the magnetic permeability of the magnetic body between the coils is $\mu2$.

According to the calculation results of FIG. 41, it can be understood that the coupling coefficient k decreases as the magnetic permeability ratio $\mu2/\mu1$ increases. As described above, in order to achieve $0.2 \leq k \leq 0.6$ with regard to the coupling coefficient k, it is beneficial to make $\mu2/\mu1$ have a value larger than one in the case of adjacency that the normalized inter-coil distance d/D is equal to or smaller than 0.2. However, if it is made excessively large, it does not satisfy the target range of the coupling coefficient depending on the degree of adjacency. Therefore, it is useful that the range of $\mu2/\mu1$ is equal to or larger one and is equal to or smaller than 100. In FIG. 41, the hatched region 300 indicates the useful region of the present implemental example.

Although the "noncontact connector apparatus" or the like is mentioned in each of the above embodiments and modified embodiments, the same apparatus may be called as a "contactless connector apparatus" or the like since it is a connector apparatus of power transfer without contact points.

Summary of the Embodiments

According to a first aspect of the present disclosure, there is provided an information transmission apparatus including a transmitter circuit configured to transmit information to a receiver circuit connected to a receiver coil; and a first noncontact connector apparatus connected to the transmitter circuit. The first noncontact connector apparatus comprises a transmitter coil, that is provided to be adjacent so as to be electromagnetically coupled to the receiver coil, and a winding of the transmitter coil is wound on a first plane. The information transmission apparatus includes a first magnetic body provided between the first plane and a second plane which is opposed to be adjacent to the first plane and on which the receiver coil is provided, and the first magnetic body is provided to be adjacent so as to be electromagnetically coupled to the transmitter coil and to cover at least one part of a region in which at least the winding of the transmitter coil exists.

According to a second aspect of the present disclosure, in the information transmission apparatus according to the first aspect of the present disclosure, a self-inductance of the transmitter coil is increased by putting the first magnetic body to be adjacent to the transmitter coil.

According to a third aspect of the present disclosure, there is provided an information transmission apparatus including: a receiver circuit configured to receive information from a transmitter circuit connected to a transmitter coil; and a second noncontact connector apparatus connected to the receiver circuit. The second noncontact connector apparatus includes a receiver coil, that is provided to be adjacent so as to be electromagnetically coupled to the transmitter coil, and a winding of the receiver coil is wound on a second plane that is opposed to be adjacent to the first plane on which the transmitter coil is provided. The information transmission apparatus includes a second magnetic body provided between the first plane and the second plane, and the second magnetic body is provided to be adjacent so as to be electromagnetically coupled to the receiver coil and to cover at least one part of a region in which at least the winding of the receiver coil exists.

According to a fourth aspect of the present disclosure, in the information transmission apparatus according to the third aspect of the present disclosure, a self-inductance of the receiver coil is increased by putting the second magnetic body to be adjacent to the receiver coil.

According to a fifth aspect of the present disclosure, there is provided an information transmission system including: the information transmission apparatus according to the first or second aspect of the present disclosure serving as a first information transmission apparatus including the transmitter circuit; and a second information transmission apparatus including the receiver circuit, and a second noncontact connector apparatus connected to the receiver circuit. The second noncontact connector apparatus comprises a receiver coil including a winding wound on the second plane. The first magnetic body is further put to be adjacent to the receiver coil to be electromagnetically coupled to the receiver coil and to cover at least one part of a region in which at least the winding of the receiver coil exists between the first plane and the second plane, thereby increasing the self-inductance of the receiver coil by putting the first magnetic body to be adjacent to the receiver coil. A coupling coefficient between the transmitter coil and the receiver coil is set to be decreased by increasing the self-inductance of each of the transmitter coil and the receiver coil so that a frequency characteristic of transmission efficiency from the transmitter coil to the receiver coil changes from a double-peaked narrow-band characteristic to a single-peaked wide-band characteristic.

According to a sixth aspect of the present disclosure, there is provided an information transmission system including: the information transmission apparatus according the first or second aspect of the present disclosure serving as a first information transmission apparatus including the transmitter circuit; and the information transmission apparatus according to the third or fourth aspect of the present disclosure serving as a second information transmission apparatus including the receiver circuit. A coupling coefficient between the transmitter coil and the receiver coil is set to be decreased by increasing the self-inductance of each of the transmitter coil and the receiver coil so that a frequency characteristic of transmission efficiency from the transmitter coil to the receiver coil changes from a double-peaked narrow-band characteristic to a single-peaked wide-band characteristic.

According to a seventh aspect of the present disclosure, in the information transmission system according to the sixth aspect of the present disclosure, the magnetic permeability of the first magnetic body is set so that the coupling coefficient is set to be equal to or larger than 0.2 and to be equal to or smaller than 0.6.

According to an eighth aspect of the present disclosure, in the information transmission system according to any one of the fifth to seventh aspects of the present disclosure, a winding of the transmitter coil is wound in a single layer along the first plane, and the winding of the receiver coil is wound in a single layer along the second plane.

According to a ninth aspect of the present disclosure, in the information transmission system according to any one of the fifth to seventh aspects of the present disclosure, the winding of at least one of the transmitter coil and the receiver coil is wound in a plurality of layers along the first or second plane, and the windings of the layers belonging to the windings of the plurality of layers are connected in series to each other.

According to a tenth aspect of the present disclosure, in the information transmission system according to any one of the fifth to seventh aspects of the present disclosure, the winding of at least one of the transmitter coil and the receiver coil is wound in a plurality of layers along the first or second plane, and the windings of the layers belonging to the windings of the plurality of layers are connected in parallel to each other.

According to an eleventh aspect of the present disclosure, in the an information transmission system according to the fifth aspect of the present disclosure, the winding of the transmitter coil is formed as a conductor pattern on a first dielectric substrate along the first plane, and the first magnetic body is formed integrally with the transmitter coil and the first dielectric substrate.

According to a twelfth aspect of the present disclosure, in the information transmission system according to the sixth or seventh aspect of the present disclosure, the winding of the transmitter coil is formed as a conductor pattern on the first dielectric substrate along the first plane, and the first magnetic body is formed integrally with the transmitter coil and the first dielectric substrate. The winding of the receiver coil is formed as a conductor pattern on a second dielectric substrate along the second plane, and the second magnetic body is formed integrally with the receiver coil and the second dielectric substrate.

INDUSTRIAL APPLICABILITY

According to the noncontact connector apparatus, the noncontact connector system, the power transfer apparatus and the power transfer system of the present disclosure, power can be transmitted with a stabilized transmission efficiency with a very simple configuration even if a positional misalignment occurs between the transmitter coil and the receiver coil.

According to the information transmission apparatus and the information transmission system of the present disclosure, information can be transmitted with a stabilized transmission efficiency with a very simple configuration even if a positional misalignment occurs between the transmitter coil and the receiver coil.

According to the induction heating apparatus of the present disclosure, the cooking container can be heated with a stabilized transmission efficiency with a very simple configuration even if a positional misalignment occurs between the induction heating coil and the cooking container.

The invention claimed is:

1. An information transmission system comprising:
   a first information transmission apparatus including a transmitter circuit configured to transmit information to a receiver circuit connected to a receiver coil, and a first noncontact connector apparatus connected to the transmitter circuit; and
   a second information transmission apparatus including a receiver circuit configured to receive information from the transmitter circuit, and a second noncontact connector apparatus connected to the receiver circuit,
   wherein the first noncontact connecter apparatus comprises a transmitter coil, that is provided to be adjacent so as to be electromagnetically coupled to the receiver coil, and a winding of the transmitter coil is wound on a first plane, and
   wherein the information transmission apparatus comprises:
   a first magnetic body provided between the first plane and a second plane which is opposed to be adjacent to the first plane and on which the receiver coil is provided, the first magnetic body being provided to be adjacent so as to be electromagnetically coupled to the transmitter coil and to cover at least one part of a region in which at least the winding of the transmitter coil exists,
   wherein the second noncontact connector apparatus comprises the receiver coil including a winding wound on the second plane,
   wherein the first magnetic body is further put to be adjacent to the receiver coil to be electromagnetically coupled to the receiver coil and to cover at least one part of a region in which at least the winding of the receiver coil exists between the first plane and the second plane, thereby increasing the self-inductance of the receiver coil by putting the first magnetic body to be adjacent to the receiver coil,
   wherein a coupling coefficient between the transmitter coil and the receiver coil is set to be decreased by increasing the self-inductance of each of the transmitter coil and the receiver coil so that a frequency characteristic of transmission efficiency from the transmitter coil to the receiver coil changes from a double-peaked narrow-band characteristic to a single-peaked wide-band characteristic, and
   wherein a center frequency of the double-peaked narrow-band characteristic is set to be lower than a center frequency of the single-peaked wide-band characteristic by increasing the self-inductance of each of the transmitter coil and the receiver coil.

2. The information transmission system as claimed in claim 1,
   wherein the winding of the transmitter coil is wound in a single layer along the first plane, and
   wherein the winding of the receiver coil is wound in a single layer along the second plane.

3. The information transmission system as claimed in claim 1,
   wherein the winding of at least one of the transmitter coil and the receiver coil is wound in a plurality of layers along the first or second plane, and
   wherein the windings of the layers belonging to the windings of the plurality of layers are connected in series to each other.

4. The information transmission system as claimed in claim 1,
   wherein the winding of at least one of the transmitter coil and the receiver coil is wound in a plurality of layers along the first or second plane, and
   wherein the windings of the layers belonging to the windings of the plurality of layers are connected in parallel to each other.

5. The information transmission system as claimed in claim 1,
   wherein the winding of the transmitter coil is formed as a conductor pattern on a first dielectric substrate along the first plane, and
   wherein the first magnetic body is formed integrally with the transmitter coil and the first dielectric substrate.

6. An information transmission system comprising:
   a first information transmission apparatus including a transmitter circuit configured to transmit information to a receiver circuit connected to a receiver coil, and a first noncontact connector apparatus connected to the transmitter circuit; and
   a second information transmission apparatus including a receiver circuit configured to receive information from the transmitter circuit, and a second noncontact connector apparatus connected to the receiver circuit,
   wherein the first noncontact connecter apparatus comprises a transmitter coil, that is provided to be adjacent so as to be electromagnetically coupled to the receiver coil, and a winding of the transmitter coil is wound on a first plane, and
   wherein the first information transmission apparatus comprises:
   a first magnetic body provided between the first plane and a second plane which is opposed to be adjacent to the first plane and on which the receiver coil is provided, the first magnetic body being provided to be adjacent so as to be electromagnetically coupled to the transmitter coil and to cover at least one part of a region in which at least the winding of the transmitter coil exists,
   wherein the second noncontact connector apparatus comprises the receiver coil including a winding wound on the second plane,
   wherein the second information transmission apparatus comprises a second magnetic body provided between the first plane and the second plane, the second magnetic body being provided to be adjacent so as to be electromagnetically coupled to the receiver coil and to cover at least one part of a region in which at least the winding of the receiver coil exists,
   wherein a coupling coefficient between the transmitter coil and the receiver coil is set to be decreased by increasing the self-inductance of each of the transmitter coil and the receiver coil so that a frequency characteristic of transmission efficiency from the transmitter coil to the receiver coil changes from a double-peaked narrow-band characteristic to a single-peaked wide-band characteristic, and wherein a center frequency of the double-peaked narrow-band characteristic is set to be lower than a center frequency of the single-peaked wide-band characteristic by increasing the self-inductance of each of the transmitter coil and the receiver coil.

7. The information transmission system as claimed in claim 6, wherein the magnetic permeability of the first magnetic body is set so that the coupling coefficient is set to be equal to or larger than 0.2 and to be equal to or smaller than 0.6.

8. The information transmission system as claimed in claim 6, wherein the winding of the transmitter coil is formed as a conductor pattern on a first dielectric substrate along the first plane, wherein the first magnetic body is formed integrally with the transmitter coil and the first dielectric substrate, wherein the winding of the receiver coil is formed as a conductor pattern on a second dielectric substrate along the second plane, and wherein the second magnetic body is formed integrally with the receiver coil and the second dielectric substrate.

* * * * *